(12) United States Patent
Reichardt et al.

(10) Patent No.: US 7,096,185 B2
(45) Date of Patent: Aug. 22, 2006

(54) USER SPEECH INTERFACES FOR INTERACTIVE MEDIA GUIDANCE APPLICATIONS

(75) Inventors: M. Scott Reichardt, Tulsa, OK (US); David M Berezowski, Tulsa, OK (US); Michael D Ellis, Buolder, CO (US); Toby DeWeese, Tulsa, OK (US)

(73) Assignee: United Video Properties, Inc., Hollywood, CA (US)

( * ) Notice: Subject to any disclaimer, the term of this patent is extended or adjusted under 35 U.S.C. 154(b) by 0 days.

(21) Appl. No.: 10/895,270

(22) Filed: Jul. 19, 2004

(65) Prior Publication Data

US 2005/0172319 A1    Aug. 4, 2005

Related U.S. Application Data

(63) Continuation of application No. 09/823,707, filed on Mar. 30, 2001.

(60) Provisional application No. 60/194,949, filed on Mar. 31, 2000.

(51) Int. Cl.
 *G10L 15/00* (2006.01)
(52) U.S. Cl. ...................... 704/275; 704/246
(58) Field of Classification Search ............... 704/246, 704/275
See application file for complete search history.

(56) References Cited

U.S. PATENT DOCUMENTS

| | | | |
|---|---|---|---|
| 5,222,121 A * | 6/1993 | Shimada | 379/88.03 |
| 5,627,940 A | 5/1997 | Rohra et al. | |
| 5,758,320 A | 5/1998 | Asano | |
| 5,774,841 A | 6/1998 | Salazar et al. | |
| 5,774,859 A | 6/1998 | Houser et al. | |
| 5,915,238 A | 6/1999 | Tjaden | |
| 6,016,336 A | 1/2000 | Hanson | |
| 6,081,782 A | 6/2000 | Rabin | |
| 6,177,931 B1 | 1/2001 | Alexander et al. | |
| 6,330,537 B1 | 12/2001 | Davis et al. | |
| 6,370,238 B1 | 4/2002 | Sansone et al. | |
| 6,415,257 B1 * | 7/2002 | Junqua et al. | 704/275 |
| 6,438,752 B1 | 8/2002 | McClard | |
| 6,452,640 B1 | 9/2002 | Yuen et al. | |
| 6,477,500 B1 * | 11/2002 | Maes | 704/275 |
| 6,563,430 B1 | 5/2003 | Kemink et al. | |

FOREIGN PATENT DOCUMENTS

EP    0 911 808    4/1999

OTHER PUBLICATIONS

Press Release, Prevue Networks, Inc., Prevue and BBN Hark Add Speech Recognition Technology to Interactive Guide (May 8, 1995).
Price Coleman, *The Power of Speech*, CONVERGENCE, Aug. 1995, pp. 16-23.
Fred Dawson, *Look Ma, No Hands*, Broadband Week, May 22, 1995, pp. 37 and 40.

* cited by examiner

*Primary Examiner*—Daniel Abebe
(74) *Attorney, Agent, or Firm*—Ropes & Gray LLP

(57) ABSTRACT

A user speech interface for interactive media guidance applications, such as television program guides, guides for audio services, guides for video-on-demand (VOD) services, guides for personal video recorders (PVRs), or other suitable guidance applications is provided. Voice commands may be received from a user and guidance activities may be performed in response to the voice commands.

21 Claims, 22 Drawing Sheets

USER SPEECH INTERFACES FOR INTERACTIVE MEDIA GUIDANCE APPLICATIONS

This application is a continuation of U.S. application Ser. No. 09/823,707, filed Mar. 30, 2001, which claims the benefit of U.S. provisional patent application No. 60/194,949, filed Mar. 31, 2000.

BACKGROUND OF THE INVENTION

This invention relates to interactive media guidance applications and more particularly, to user speech interfaces for interactive media guidance applications.

Interactive media guidance applications, such as television program guides, guides for audio services, guides for video-on-demand (VOD) services, and guides for personal video recorders (PVRs), guide users in their access of media offered through media distribution systems such as cable television systems, digital broadcasting services, and the Internet. Home recording devices, such as videocassette recorders (VCRs), audiocassette recorders, digital versatile disc (DVD) recorders, compact disc (CD) recorders, and PVRs such as those provided by ReplayTV™ and TiVo™, allow users to record media for later access. These devices supplement the media that is available to users via distribution systems. Such devices and distribution systems, whether used separately or used in combination, provide users with vast amounts of media from which to choose. Accordingly, it would be desirable to increase the ease with which users can navigate through media or access guidance application features.

It is therefore an object of the present invention to provide a user speech interface for interactive media guidance applications that allows users to navigate through media or access guidance application features.

SUMMARY OF THE INVENTION

This and other objects of the present invention are accomplished by providing a user interface with speech recognition. The user interface with speech recognition allows users to navigate within interactive media guidance applications, such as television program guides, guides for audio services, guides for video-on-demand (VOD) services, guides for personal video recorders (PVRs), or other suitable guidance applications. Such an interface may provide hands-free control over some features of such media guidance applications. Various embodiments and features of the present invention are described, for example, in U.S. provisional patent application No. 60/194,949, which is hereby incorporated by reference herein in its entirety.

In some embodiments a device such as a wired or wireless microphone may be used to receive guidance voice commands from a user. When a single microphone is used, it may be located in a communal place in a room. Speakers may be used to provide audible outputs.

Some embodiments may receive voice commands from a user and may perform guidance activities in response to the voice commands. Such guidance activities may include, for example, source selection, browsing, obtaining media information, recording, playing back, or any other suitable guidance activity. Guidance activities may be performed on media sources which may be provided by interactive media guidance applications. Such media sources may include, for example, television channels, audio channels, video-on-demand content, recorded content (e.g., content recorded to a PVR, videocassette recorder (VCR), compact disc (CD) recorder, digital versatile disc (DVD) recorder, or any other suitable recording device), Internet-delivered content (e.g., websites, video, or any other suitable Internet-delivered content), or any other suitable media source.

Some embodiments may select media sources in response to received voice commands. Source selection may be performed from any suitable media source to select content from any other suitable media source. For example, a user may be provided with content from a first media source. Upon receiving a voice command indicating content from a second media source, the interactive media guidance application may perform the source selection and may provide the user with the content from the second media source. Thus, the content from the first media source provided to the user may be replaced or augmented by content from the second media source in response to the received voice command. In another suitable approach, some feature of a second source may be provided to a user from a first source. The first and second media sources may be two different types of media sources. In another suitable approach, the first and second media sources may be of the same type.

Some embodiments may perform browsing operations in response to received voice commands. Browsing operations may be performed from any suitable media source to browse media available for any other suitable media source. For example, a user may be provided with content from a first media source. Upon receiving a voice command indicating content from a second media source for browsing, the interactive media guidance application may provide the user with a browse display for the content. Thus, in response to the received voice command, a browse display may be provided as an overlay on the content from the first media source. In another suitable approach, the overlay may be provided on a display device separate from the display device that includes the content from the first source. In one suitable approach, the first and second media sources may be two different types of media sources. In another suitable approach, the first and second media sources may be of the same type.

Some embodiments may provide users with information corresponding to a media source in response to received voice commands. Responses to information requests may be provided from any suitable media source and may provide information for any other suitable media source. For example, a user may be provided with content from a first media source. Upon receiving a voice command indicating an information request for content from a second media source, the interactive media guidance application may provide the user with audible information related to the content from the second source. In another suitable approach, the interactive media guidance application may provide the user with visual information corresponding to the audible information related to the content. Thus, audio for the content from the first media source may be replaced or augmented by audible information related to the content from the second media source in response to the received voice command. In another suitable approach, the volume of audio for the content from the first media source may be lowered or muted.

Some embodiments may record content from a media source in response to received voice commands. Recording may be performed from any suitable media source. For example, a user may be provided with content from a first media source. Upon receiving a voice command indicating that the user wishes to record content from a second media source, such as "record," the content may be recorded to a desired recording device. This is an example of "one word record" functionality. A default recording device (e.g., DVD recorder, PVR, VCR, CD recorder, or any other suitable recording device) may be specified by the user at some time prior to recording such that upon receiving the command "record," the content from the second media source is automatically recorded to the default device.

In another suitable approach, the device on which to record the content from the second source may be specified by receiving an additional command from the user, such as "PVR," "VCR," "DVD recorder," "CD recorder," or any other command corresponding to a suitable recording device. In yet another suitable approach, multiple users may be provided for such that a file to record the content from the second source may be specified by the user. For example, an audible question may be provided to the user, such as, "What file?" To this question, a user name such as "Dad" may be received from the user. Thus, the content may be recorded to Dad's file. In another suitable approach, a specific file to record the content from the second media source may be chosen based on voice recognition. For example, a voice command to record may be received from a user. A voice recognition system may recognize the identity of the user based on the user's voice, based on the microphone that received the voice command, or based on any other suitable approach. The content from the second media source may record to a file associated with the identity of the user.

Some embodiments may play back previously-recorded media source content in response to received voice commands. Playing back may be performed from any suitable media source content. For example, a user may be provided with content from a first media source. Upon receiving a voice command indicating that the user wishes to play back previously-recorded content from a second media source, such as "play back," the previously-recorded content may be played back from a desired recording device. A default recording device (e.g., DVD recorder, PVR, VCR, CD recorder, or any other suitable recording device) may be specified by the user at some time prior to playing back such that upon receiving the command "play back," the previously-recorded content is automatically played back from the default device.

In another suitable approach, the device from which to play back the previously-recorded content may be specified by receiving an additional command from the user, such as "PVR," "VCR," "DVD recorder," "CD recorder," or a command corresponding to any other suitable recording device. In yet another suitable approach, multiple users may be provided for such that a file from which to play back the previously-recorded content may be specified by the user. For example, an audible question may be provided to the user, such as, "What file?" To this question, a user name such as "Dad" may be received from the user. Thus, the content may be played back from Dad's file. In another suitable approach, a specific file from which to play back the content may be chosen based on voice recognition. For example, a voice command to play back may be received from a user. A voice recognition system may recognize the identity of the user based on the user's voice, based on the microphone that received the voice command, or based on any other suitable approach. The content may be played back from a file associated with the identity of the user.

Some embodiments may receive selections of features for an audible favorites list from a user and may provide the features of the favorites list to the user in an audible scan. For example, a menu from which features may be selected for an audible favorites list may be provided to a user. Such a menu may include, for example, non-media options (e.g., sports, weather, news, stocks, traffic, or any other suitable non-media option), media-related options (e.g., channels, programs, settings, reminders, advertisements, or any other suitable media-related option), or any other features suitable for inclusion in the audible favorites list. The interactive media guidance application may provide information related to the user-selected features in an audible scan. This information may be provided to the user automatically. In another suitable approach, this information may be provided to the user in response to a user voice command requesting to listen to the audible favorites. The audible information may be provided using audio clips or files associated with the favorites features, streamed audio, audio generated from text, or using any other suitable approach. The user may interact with the information provided in the audible scan.

Some embodiments may perform features specific to a user based on the user's identity. For example, a voice command from a user may be received by a microphone. A voice recognition system may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The identity of the user may be used to perform features specific to the user. Such features may include, for example, customized guide interfaces, targeted advertisements, audience measuring, favorites, or any other suitable user-specific feature.

Some embodiments may provide a user with targeted advertisements based on the user's monitored actions. For example, actions of a user may be monitored to determine advertisements appropriate for the user. A voice command from the user may be received by a microphone. A voice recognition system may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The user may be provided with targeted advertisements based on the monitored actions. In one suitable approach, targeted advertisements may be associated with a user for use in the future.

Some embodiments may determine the identity of a user and measure audience information based on the user's profile. For example, a voice command from a user may be received by a microphone. A voice recognition system may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The user may be provided with content from a media source. Audience information for the media source content may be measured by using a user profile associated with the user. The user profile may include demographic data such as, for example, age, gender, nationality, profession, income, location, or any other suitable data. The audience information may be measured using this data to create a detailed description of the audience.

Some embodiments may determine the identity of a user and may provide the user with favorites features based on the user's identity. Favorites features may include a user's favorite television channels, websites, audio channels, or any other suitable feature. For example, a voice command from a user may be received by a microphone. A voice recognition system may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The user may be provided with favorites features based on the user's identity.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The speech interface for interactive media guidance applications of the present invention may be provided using any suitable hardware platform. Suitable platforms may include, for example, hardware such as satellite receivers, personal computer televisions (PC/TVs), personal computers (e.g., with television tuner cards), cable set-top boxes, or any other suitable hardware. One suitable interactive media guidance application is a television program guide. Illustrative interactive television program guide systems are described, for example, in knee et al. U.S. Pat. No. 5,589,892 and Knudson et al. U.S. patent application Ser. No. 09/357,941, filed Jul. 16, 1999, which are hereby incorporated by reference herein in their entireties. Client-server program guide systems are described, for example, in Ellis et al. U.S. patent application Ser. No. 09/374,043, filed Aug. 13, 1999, which is hereby incorporated by reference herein in its entirety. On-line program guide systems are described, for example, in Boyer et al. U.S. patent application Ser. No. 08/938,028, filed Sep. 18, 1997, which is hereby incorporated by reference herein in its entirety.

The interactive media guidance applications may allow users to record media on digital or analog storage devices (e.g., videocassettes, hard disks, floppy discs, flash memory, recordable compact discs (CDs), recordable digital versatile discs (DVDs), or any other type of storage). Interactive program guides having digital storage are described, for example, in Hassell et al. U.S. patent application Ser. No. 09/157,256, filed Sep. 17, 1998, which is hereby incorporated by reference herein in its entirety. Recording of media can also be performed by a media guidance application or other server. Client-server based program guides with remote server recording are described, for example, in Ellis et al. U.S. patent application Ser. No. 09/332,244, filed Jun. 11, 1999, which is hereby incorporated by reference herein in its entirety. On-line media guidance applications may also record media or direct a user's equipment to record media.

Figure 1:
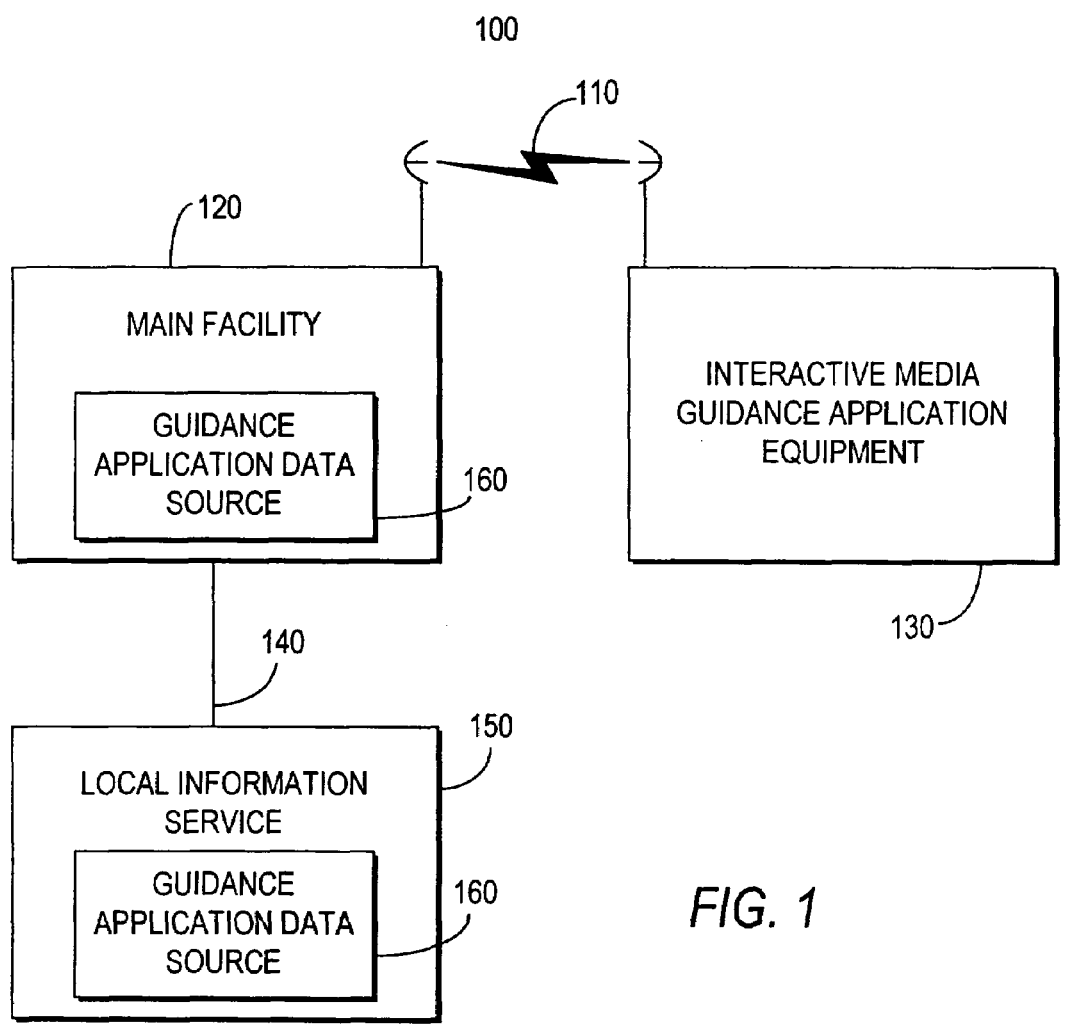
FIG. 1 is a schematic block diagram of an illustrative system in accordance with one embodiment of the present invention.

An illustrative system 100 in accordance with one embodiment of the present invention is shown in FIG. 1. Main facility 120 provides guidance application data from guidance application data source 160 to interactive media guidance application equipment 130 via communications link 110. There may be multiple guidance application data sources but only one has been shown to avoid over-complicating the drawing. If desired, guidance application data sources may be located at facilities separate from main facility 120, such as at local information service 150, and have their data provided to main facility 120 for localization and distribution. Guidance application data source 160 may be any suitable computer or computer-based system for obtaining data (e.g., manually from an operator, electronically via a computer network or other connection, or via storage media) and putting the data into electronic form for distribution by main facility 120. Link 110 may be a satellite link, a telephone network link, a cable or fiber optic link, a microwave link, an Internet link, a combination of such links, or any other suitable communications link. Video signals may also be transmitted over link 110 if desired.

Local information service 150 may be any suitable facility for obtaining data particular to a localized region and providing the data to main facility 120 over communications link 140. Local information service 150 may be, for example, a local weather station that measures weather data, a local newspaper that obtains local high school and college sporting information, or any other suitable provider of information. Local information server 150 may be a local business with a computer for providing main facility 120 with, for example, local ski reports, fishing conditions, menus, or any other suitable provider of information. Link 140 may be a satellite link, a telephone network link, a cable or fiber optic link, a microwave link, an Internet link, a combination of such links, or any other suitable communications link.

The guidance application data transmitted by main facility 120 to interactive media guidance application equipment 130 may include programming data (e.g., program identifiers, times, channels or other indicators of source, program titles, and program descriptions) and other data for services other than program listings (e.g., help text, pay-per-view information, weather information, sports information, music channel information, associated Internet web links, associated software, or any other suitable information). There are preferably numerous pieces or installations of interactive media guidance application equipment 130, although only one is shown in FIG. 1 to avoid over-complicating the drawing.

Guidance application data may be transmitted by main facility 120 to interactive media guidance application equipment 130 using any suitable approach. Data files may, for example, be encapsulated as objects transmitted using a suitable Internet based addressing scheme and protocol stack (e.g., a stack which uses the user datagram protocol (UDP) and Internet protocol (IP)).

An interactive media guidance application is implemented on interactive media guidance application equipment 130. Five illustrative arrangements for interactive media guidance application equipment 130 are shown in FIGS. 2A–2E. As shown, interactive media guidance application equipment 130 may include distribution equipment 170 located at distribution facility 1807 and user television equipment 200 or personal computer 240.

Figure 2A:
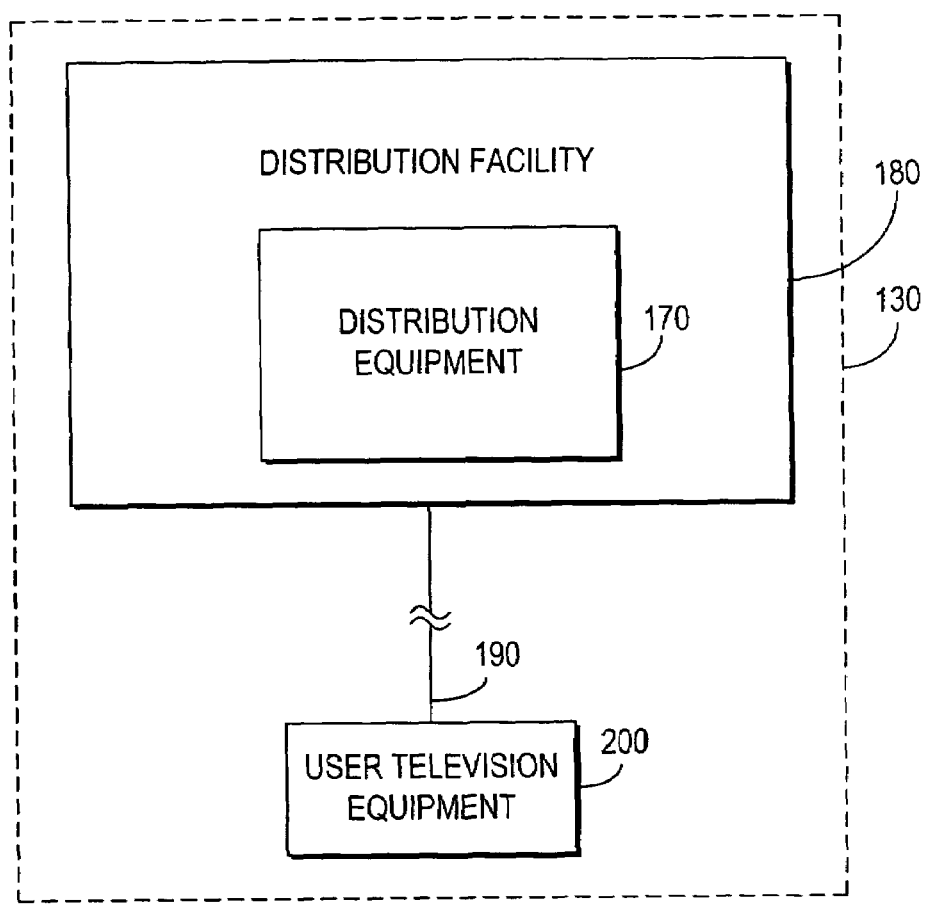
FIGS. 2A–2E show illustrative arrangements for the interactive media guidance application equipment of FIG. 1 in accordance with several embodiments of the present invention.
Figure 2B:
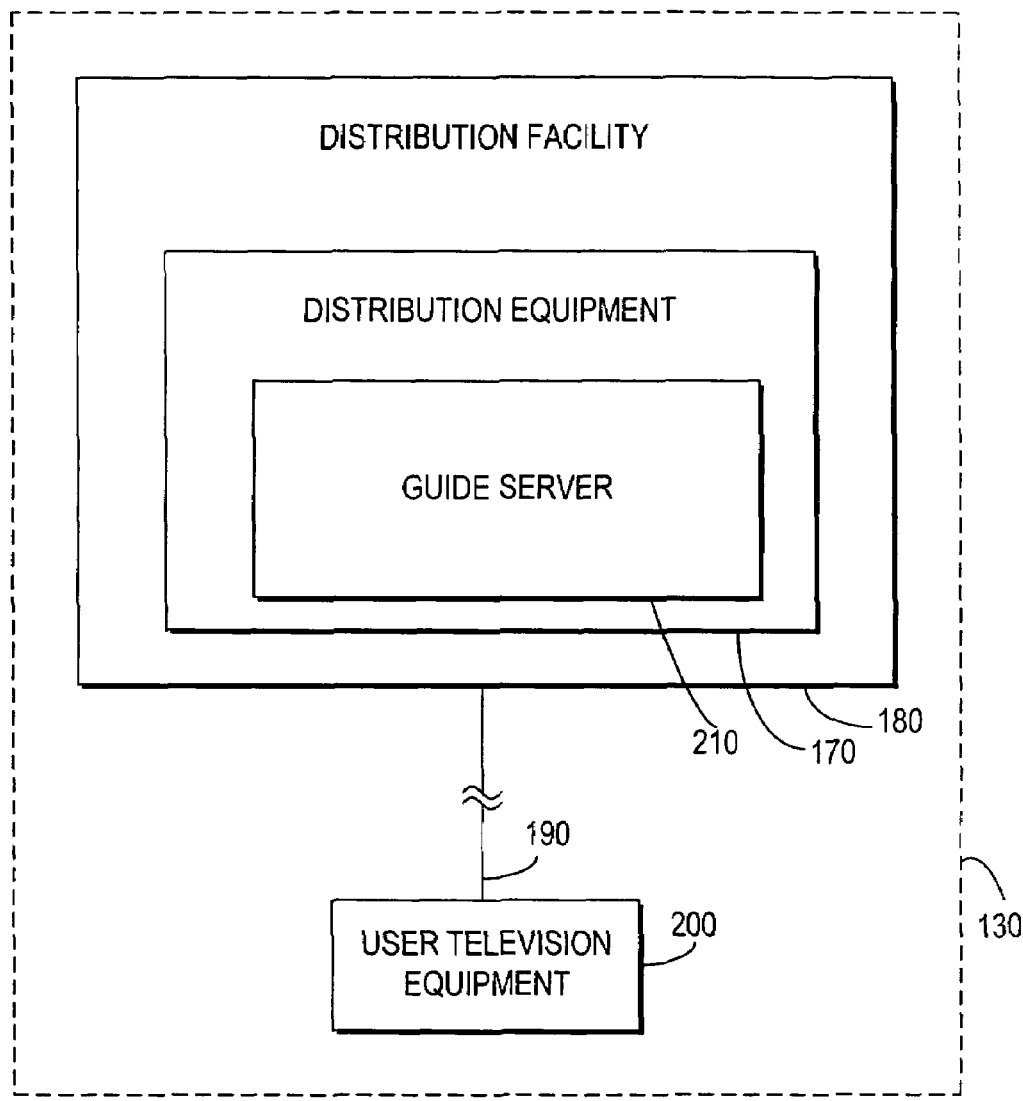
Figure 2C:
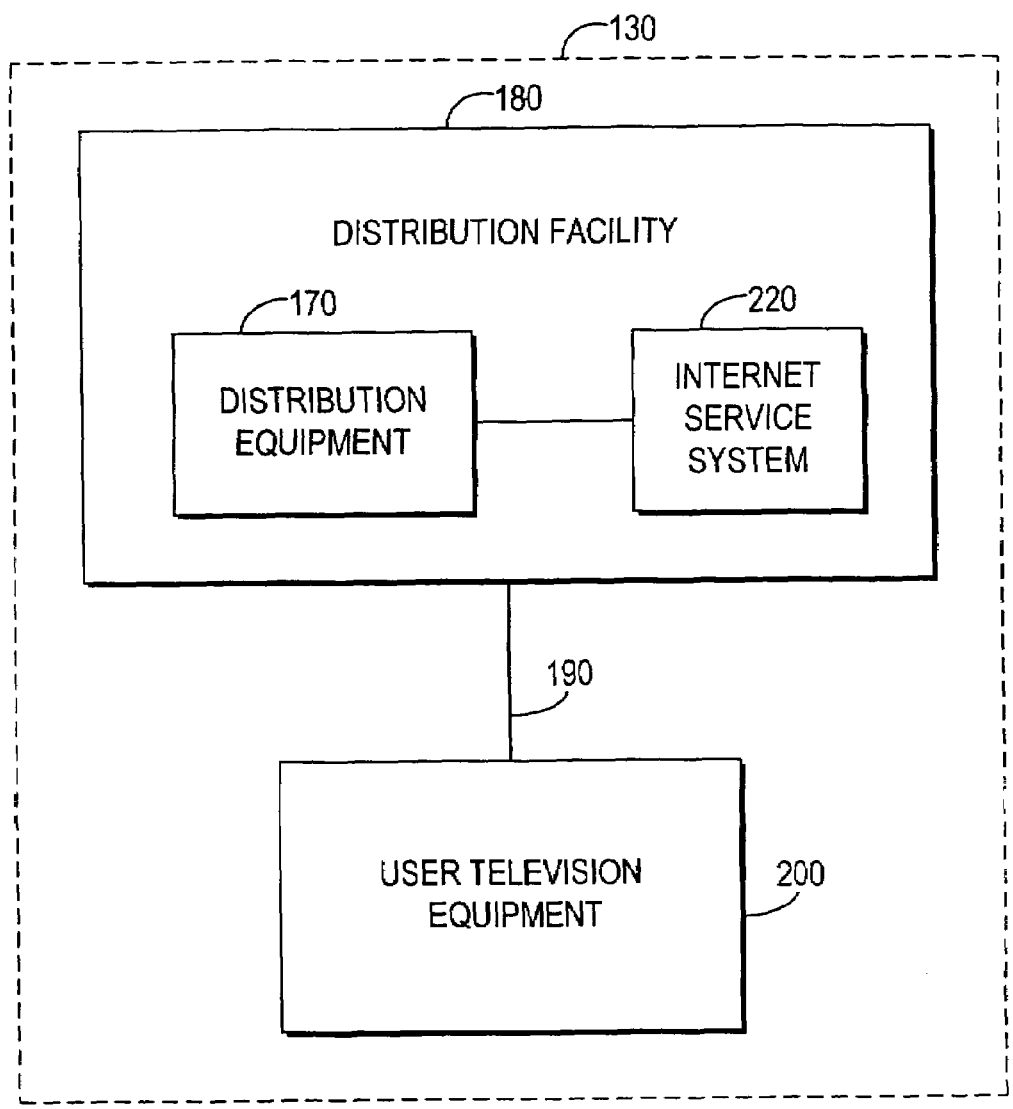
Figure 2D:
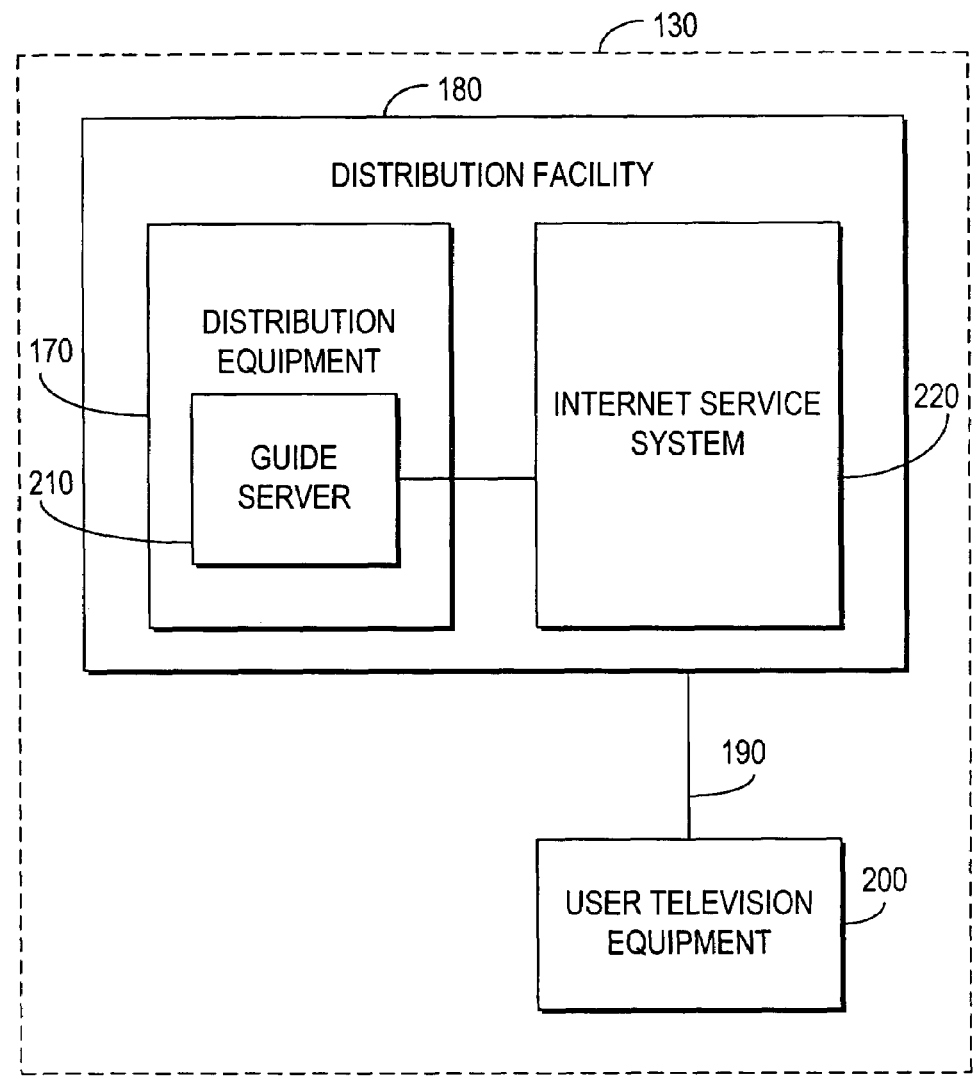

The interactive media guidance application may run totally on user television equipment 200 using the arrangements of FIGS. 2A and 2C, or may run partially on user television equipment 200 and partially on interactive media guidance application equipment 130 using a suitable client-server or distributed processing arrangement such as those shown in FIGS. 2B and 2D. Distribution facility 180 may be any suitable distribution facility (e.g., a cable system headend, a broadcast distribution facility, or any other suitable type of distribution facility), and may have distribution equipment 170.

Figure 2E:
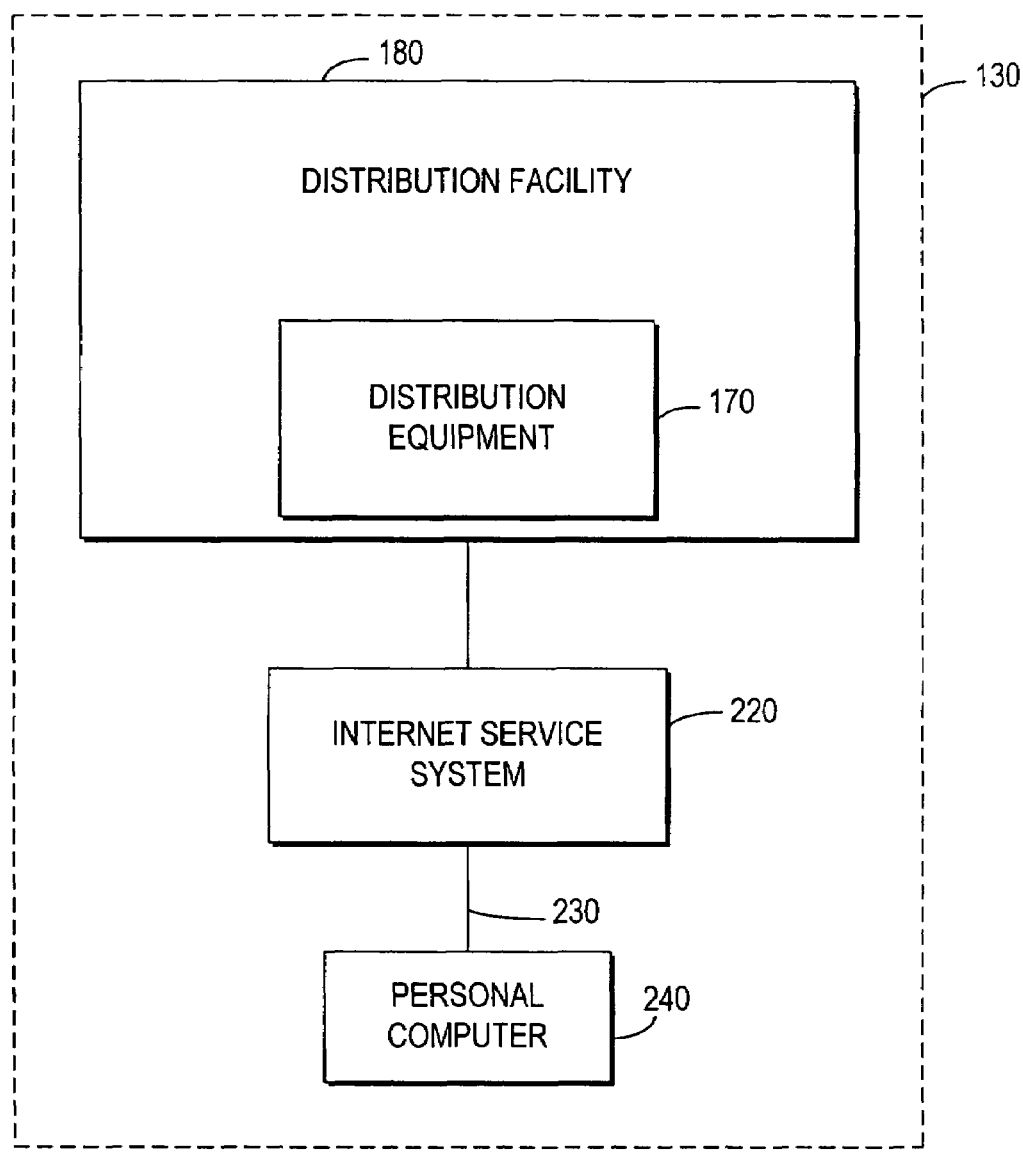

Distribution equipment 170 of FIGS. 2A, 2B, 2C, and 2D is equipment suitable for providing media guidance application data to user television equipment 200 over communications path 190. In FIG. 2E, distribution equipment 170 may provide guidance application data to Internet service system 220 via, for example, a suitable computer network or Internet link. Distribution equipment 170 may include, for example, suitable transmission hardware for distributing guidance application data on a television channel sideband, in the vertical blanking interval (VBI) of a television channel, using an in-band digital signal, using an out-of-band digital signal, or by any other suitable data transmission technique. Analog or digital video signals (e.g., television programs) may also be distributed by distribution equipment 170 to user television equipment 200 over communications paths 190 on multiple television channels. In another suitable approach, videos may be distributed to user television equipment 200 from some other suitable distribution facility, such as a cable system headend, a broadcast distribution facility, a satellite television distribution facility, or any other suitable type of television distribution facility.

Communications paths 190 may be any communications paths suitable for distributing guidance application data. Communications paths 190 may include, for example, a satellite link, a telephone network link, a cable or fiber optic link, a microwave link, an Internet link, a data-over-cable service interface specification (DOCSIS) link, a combination of such links, or any other suitable communications link. Communications paths 190 may have sufficient bandwidth to allow distribution facility 180 or another distribution facility to distribute programming to user television equipment 200. There are typically multiple pieces of user television equipment 200 and multiple associated communications paths 190, although only one piece of user television equipment 200 and communications path 190 are shown in FIGS. 2A–2D to avoid over-complicating the drawings. If desired, programming and guidance application data may be provided over separate communications paths.

FIG. 2B shows an illustrative arrangement for interactive media guidance application equipment 130 in a client-server based or distributed interactive media guidance application system. As shown in FIG. 2B, distribution equipment 170 may include guide server 210. Guide server 210 may use any suitable combination of hardware and software to provide a client-server based media guidance application. Guide server 210 may, for example, run a suitable database engine (e.g., SQL Server by Microsoft) and provide guidance application data in response to queries generated by a guide client implemented on user television equipment 200. If desired, guide server 210 may be located at main facility 120 or at another location, such as a cable system headend, a broadcast distribution facility, a satellite television distribution facility, or any other suitable type of television distribution facility.

The media guidance application may retrieve guidance application data from guide server 210 using any suitable client-server based approach. The media guidance application may, for example, pass SQL requests as messages to guide server 210. In another suitable approach, the media guidance application may invoke remote procedures that reside on guide server 210 using one or more remote procedure calls. Guide server 210 may execute SQL statements for such invoked remote procedures. In still another suitable approach, client objects executed by the media guidance application may communicate with server objects executed by guide server 210 using, for example, an object request broker (ORB). This may involve using, for example, Microsoft's Distributed Component Object Model (DCOM) approach.

The interactive media guidance application implemented on interactive media guidance application equipment 130 may communicate with guide server 210 over communications path 190 using any suitable network and transport layer protocols, if desired. They may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, DOCSIS or any other suitable network and transport layer protocols.

FIGS. 2C and 2D show illustrative Internet-based interactive media guidance application systems. Distribution facility 180 may include, for example, Internet service system 220. Internet service system 220 may use any suitable combination of hardware and software capable of providing guidance application data to the guide using an Internet based approach (e.g., the HyperText Transfer Protocol (HTTP)). If desired, Internet service system 220 may be located at a facility that is separate from distribution facility 180.

In embodiments where the interactive media guidance application is implemented on user television equipment 200 of interactive program guide television equipment 130 as shown in FIG. 2C, Internet service system 220 (or other suitable equipment at distribution facility 180 that is connected to Internet service system 220) may provide guidance application data to user television equipment 200 via the Internet, or via distribution equipment 170 using any suitable Internet-based approach (e.g., using the HyperText Transfer Protocol (HTTP) over a Transmission Control Protocol/Internet Protocol (TCP/IP) type link). If the media guidance application implemented on interactive media guidance application equipment 130 is a client-server guide as shown in FIG. 2D, guide server 210 may obtain guidance application data from Internet service system 220. The media guidance application may also, however, obtain guidance application data from Internet service system 220 via an Internet connection.

In another suitable arrangement, distribution equipment 170 may include computer equipment or other suitable hardware on which a first portion or version of the interactive media guidance application is implemented. A second portion or version of the interactive media guidance application may be implemented on user television equipment 200. The two versions or portions of the interactive media guidance application may communicate using any suitable peer-to-peer communications scheme (e.g., messaging, remote procedure calls, or any other suitable communications scheme) and perform interactive media guidance application functions distributively between distribution facility 180 and user television equipment 200.

Another suitable arrangement in which an on-line media guidance application is implemented on interactive media guidance application equipment 130 is shown in FIG. 2E. On-line program guide systems are described, for example, in above-mentioned Boyer et al. U.S. patent application Ser. No. 08/938,028, filed Sep. 18, 1997. The user may have personal computer (PC) 240 on which a media guidance application client or web browser is implemented. Personal computer 240 may be connected to Internet service system 220 via Internet link 230. Internet service system 220 may use any suitable combination of computer hardware and software capable of providing an on-line media guidance application server application or website. Internet service system 220 is shown as obtaining guidance application data from distribution facility 180. In other suitable approaches, Internet service system 220 may obtain information from other systems such as, for example, main facility 120, local information service 150, or any other suitable source of guidance application data.

Figure 3:
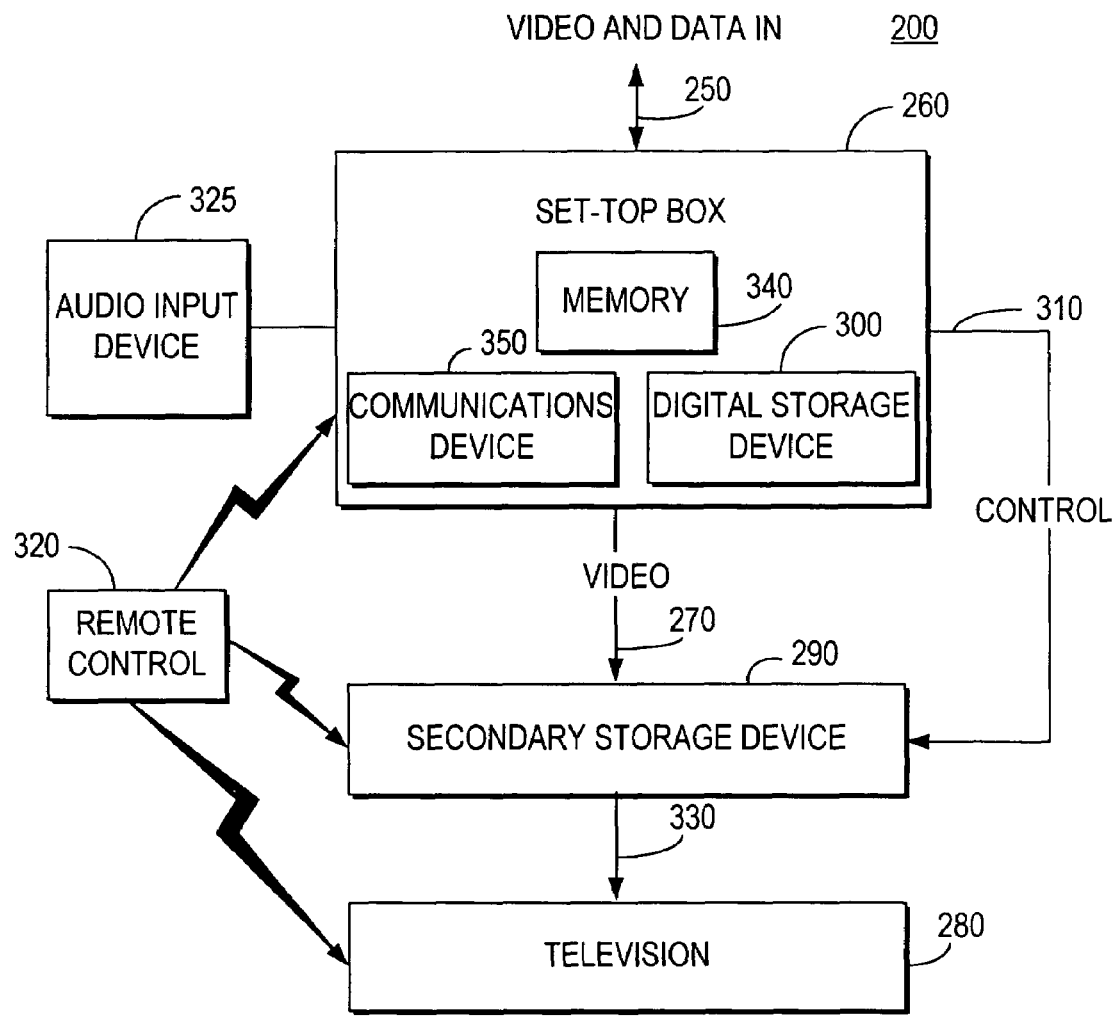
FIG. 3 is an illustrative schematic block diagram of the user television equipment of FIGS. 2A–2E in accordance with one embodiment of the present invention.

An illustrative arrangement for user television equipment 200 is shown in FIG. 3. User television equipment 200 of FIG. 3 receives video or a digital video stream and data from distribution facility 180 (FIG. 2A), or some other suitable distribution facility, at input 250. During normal television viewing, a user may tune set-top box 260 to a desired channel. The signal for that channel is then provided at video output 270. The signal supplied at output 270 is typically either a radio-frequency (RF) signal on a predefined channel (e.g., channel 3 or 4), or an analog demodulated video signal, but may also be a digital signal provided to television 280 on an appropriate digital bus (e.g., a bus using the Institute of Electrical and Electronics Engineers (IEEE) 1394 standard, (not shown)). The video signal at output 270 is received by optional secondary storage device 290.

The interactive media guidance application may run on set-top box 260, on television 280 (if television 280 has suitable processing circuitry and memory), on a suitable analog or digital receiver connected to television 280, or on digital storage device 300 (if digital storage device 300 has suitable processing circuitry and memory). The interactive media guidance application may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 290 can be any suitable type of analog or digital program storage device (e.g., a videocassette recorder (VCR), a personal video recorder (PVR), a digital versatile disc (DVD) recorder, or any other suitable device). Program recording and other features may be controlled by set-top box 260 using control path 310. If secondary storage device 290 is a VCR or a PVR, for example, a typical control path 310 involves the use of an infrared transmitter coupled to the infrared receiver in the recorder that normally accepts commands from a remote control such as remote control 320. Remote control 320 may be used to control set-top box 260, secondary storage device 290, and television 280. Audio input device 325 may be used to control set-top box 260. Audio input device 325 may be a microphone or any other suitable device for receiving audio input. Audio input device 325 may be included in remote control 320 if desired.

If desired, a user may record media such as programs, guidance application data, or a combination thereof in digital form on optional digital storage device 300. Digital storage device 300 may be a writeable optical storage device (such as a DVD recorder capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 300 can be contained in set-top box 260 or it can be an external device connected to set-top box 260 via an output port and appropriate interface. If necessary, processing circuitry in set-top box 260 formats the received video, audio and data signals into a digital file format. The file format may be an open file format such as the Moving Picture Experts Group (MPEG) MPEG-2 standard or the Moving Joint Photographic Experts Group (MJPEG) standard. The resulting data is streamed to digital storage device 300 via an appropriate bus (e.g., a bus using the Institute Electrical and Electronics Engineers (IEEE) 1394 standard), and is stored on digital storage device 300. In another suitable approach, an MPEG-2 data stream or series of files may be received from distribution equipment 170 and stored.

Television 280 receives video signals from secondary storage device 290 via communications path 330. The video signals on communications path 330 may either be generated by secondary storage device 290 when playing back prerecorded storage media (e.g., a videocassette or a recordable DVD), by digital storage device 300 when playing back pre-recorded digital media, may be passed through from set-top box 260, may be provided directly to television 280 from set-top box 260 if secondary storage device 290 is not included in user television equipment 200, or may be received directly by television 280. During normal television viewing, the video signals provided to television 280 correspond to the desired channel to which a user has tuned with set-top box 260. Video signals may also be provided to television 280 by set-top box 260 when set-top box 260 is used to play back information stored on digital storage device 300.

Set-top box 260 may have memory 340. Memory 340 may be any memory or other storage device, such as a random access memory (RAM), read only memory (ROM), flash memory, a hard disk drive, a combination of such devices, or any other suitable storage device, that is suitable for storing media guidance application instructions and guidance application data for use by the media guidance application.

Set-top box 260 may have communications device 350 for communicating directly with distribution equipment 170, guide server 210 or Internet service system 220 over communications path 190. Communications device 350 may be a modem (e.g., any suitable analog or digital standard, cellular, or cable modem), network interface card (e.g., an Ethernet card, Token ring card, or any other suitable network interface card), any other suitable communications device, or a combination of such devices. Communications device 350 may be a personal computer with an Internet connection in, for example, the arrangement shown in FIGS. 2C and 2D. Television 280 may also have such a suitable communications device if desired. In another suitable approach, user television equipment 200 may communicate with Internet service system 220 via distribution equipment 170 using a suitable return path.

Figure 4:
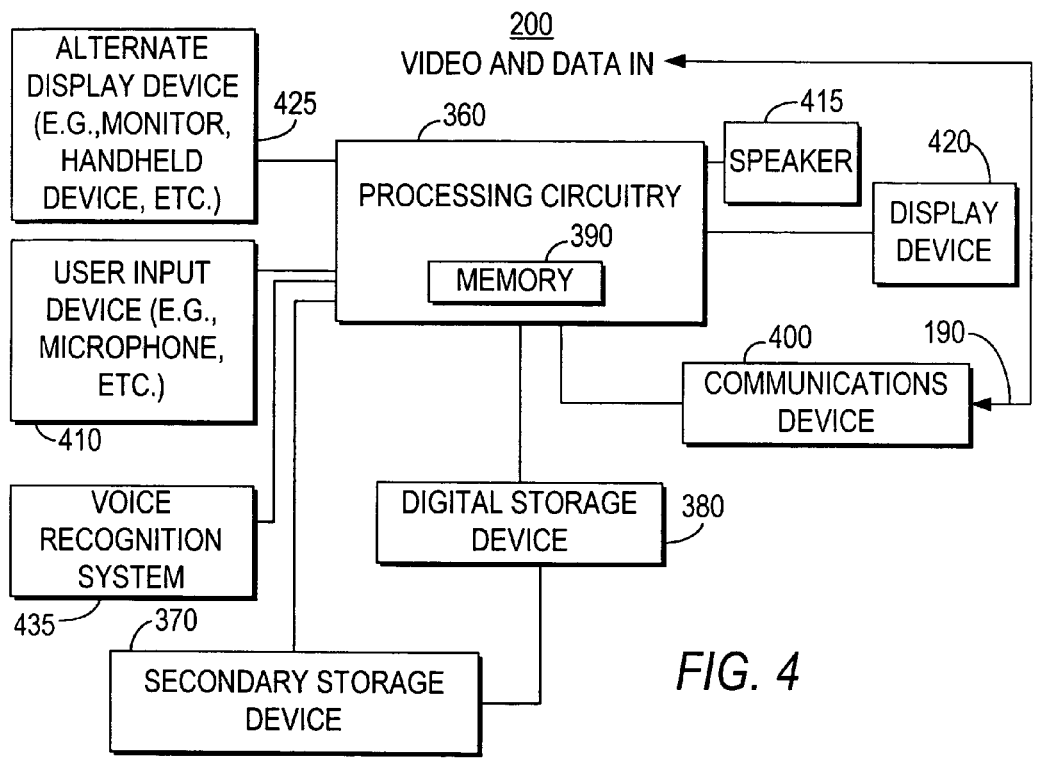
FIG. 4 is a generalized schematic block diagram of portions of the illustrative user television equipment of FIG. 3 in accordance with one embodiment of the present invention.

A more generalized embodiment of user television equipment 200 of FIG. 3 is shown in FIG. 4. As shown in FIG. 4, guidance application data from distribution facility 180 (FIG. 2A) is received by processing circuitry 360 of user television equipment 200. Processing circuitry 360 may include any suitable processor, such as a microprocessor or group of microprocessors (e.g., an Intel Pentium microprocessor, an IBM PowerPC microprocessor, or any other suitable microprocessor), and other processing circuitry such as caching circuitry, video decoding circuitry, direct memory access (DMA) circuitry, input/output (I/O) circuitry, any other suitable processing circuitry, or a combination of such circuitry. The functions of processing circuitry 360 may be provided using the set-top box arrangement of FIG. 3. In another suitable approach, these functions may be integrated into an advanced television receiver, personal computer television (PC/TV), or any other suitable arrangement. If desired, a combination of such arrangements may be used.

User television equipment 200 may have secondary storage device 370 and digital storage device 380 for recording media. Secondary storage device 370 can be any suitable type of analog or digital program storage device (e.g., a videocassette recorder (VCR), a personal video recorder (PVR), a digital versatile disc (DVD) recorder, or any other suitable device). Program recording and other features may be controlled by processing circuitry 360. Digital storage device 380 may be, for example, a writeable optical storage device (such as a DVD recorder capable of handling recordable DVD discs), a magnetic storage device (such as a disk drive or digital tape), or any other digital storage device.

User television equipment 200 may have memory 390. Memory 390 may be any memory or other storage device, such as a random access memory (RAM), read only memory (ROM), flash memory, a hard disk drive, any other suitable device, or a combination of such devices, that is suitable for storing media guidance application instructions and guidance application data for use by processing circuitry 360.

User television equipment 200 of FIG. 4 may have communications device 400 for supporting communications between the interactive media guidance application and distribution equipment 170, guide server 210, or Internet service system 220 via communications path 190. Communications device 400 may be a modem (e.g., any suitable analog or digital standard, cellular, or cable modem), network interface card (e.g., an Ethernet card, Token ring card, or any other suitable network interface card), or other suitable communications device.

A user may control the operation of user television equipment 200 with user input device 410. User input device 410 may be a pointing device, wireless remote control, keyboard, touch-pad, microphone, or any other suitable user input device. In one suitable approach, a microphone may receive voice commands from a user, which may be processed by voice recognition system 435. The microphone may be wired or wireless. In the case of just one microphone, it may be located in a communal place in a room. However, the microphone may be included in a remote control device, a set-top box, or any other suitable location. A remote control device with a microphone may include a button for the user to press to alert processing circuitry 360 that the user desires to give a voice command. Such a button may be held by the user while giving the voice command. In another suitable approach, the user may press and release the button prior to giving the voice command.

Voice recognition system 435 may be included separate from other equipment, in processing circuitry 360, in guide server 210 or other equipment at a headend, or in any other suitable location. Voice recognition system 435 may receive voice commands via a microphone (e.g., user input device 410). Voice recognition system 435 may include media cancellation circuitry that may monitor the audio output of user television equipment 200 or personal computer 240. This audio output may be subtracted from input to the microphone which may be, for example, voice commands from a user. Thus, user voice commands may be distinct from audio output of user television equipment 200 or personal computer 240. Voice recognition system 435 may be able to determine a user's identity. Voice recognition system 435 may make such an identification by the sound of the voice giving the voice command, by the input device used to give the voice command (e.g., by associating a user with a specific microphone for receiving voice commands), or by any other suitable approach for user identification.

Audible output related to an interactive media guidance application may be provided by one or more speakers 415. Speaker 415 may be separate from display device 420. In another suitable approach, speaker 415 may be integrated into display device 420.

To watch television, for example, a user may instruct processing circuitry 360 to display a desired television channel on display device 420. Display device 420 may be any suitable television, monitor, or other suitable display device. To access the functions of the interactive media guidance application, a user may instruct the interactive media guidance application implemented on interactive media guidance application equipment 130 to generate a main menu or other desired guide display screen for display on display device 420. Alternate display device 425 may be provided to display guide display screens such as menus, browse displays, or any other suitable screen. Alternate display device 425 may be a hand-held device (e.g., a remote control), a monitor, or any other suitable device. Alternate display device 425 may be used for guide display screens thereby allowing the entire viewing area of display device 420 to be used for programming.

A user interface with speech recognition is provided to allow users to navigate within interactive media guidance applications, such as television program guides, guides for audio services, guides for video-on-demand (VOD) services, guides for personal video recorders (PVRs), or any other suitable guidance applications. Such an interface may provide hands-free control over some features of such media guidance applications. A device such as a wired or wireless microphone may be used to receive guidance voice commands from a user. For clarity, the present invention will be described in terms of a microphone as the user interface device which is used to receive a user's voice commands. However, any other device suitable for receiving a user's voice commands may be used, if desired. For example, a remote access device may receive voice commands. Interactive guide systems and remote access devices for such systems that have speech interfaces are described, for example, in Ellis et al. U.S. patent application Ser. No. 09/354,344, filed Jul. 16, 1999, which is hereby incorporated by reference herein in its entirety.

Some embodiments may receive voice commands from a user and may perform guidance activities in response to the voice commands. Such guidance activities may include, for example, source selection, browsing, obtaining media information, recording, playing back, or any other suitable guidance activity. Guidance activities may be performed on media sources which may be provided by interactive media guidance applications. Such media sources may include, for example, television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source. Media source content may include menus, browse displays, or any other suitable display associated with a media source.

Some embodiments may select media sources in response to received voice commands. Source selection may be performed from any suitable media source to select any other suitable media source. For example, a user may be provided with content from a first media source, such as a television program. Upon receiving a voice command indicating content from a user-selected second media source, such as media recorded to a PVR, the interactive media guidance application may perform the source selection and may provide the user with the content from the second source. Thus, the television program, which is the first media source content, may be replaced or augmented by recorded media from the PVR, which is the second media source content, in response to the received voice command. In another example, a user may be provided with, for example, Internet-delivered media. Upon receiving a voice command indicating a user selection of an audio channel, the interactive media guidance application may perform the source selection and provide the user with the specified audio channel.

Figure 5A:
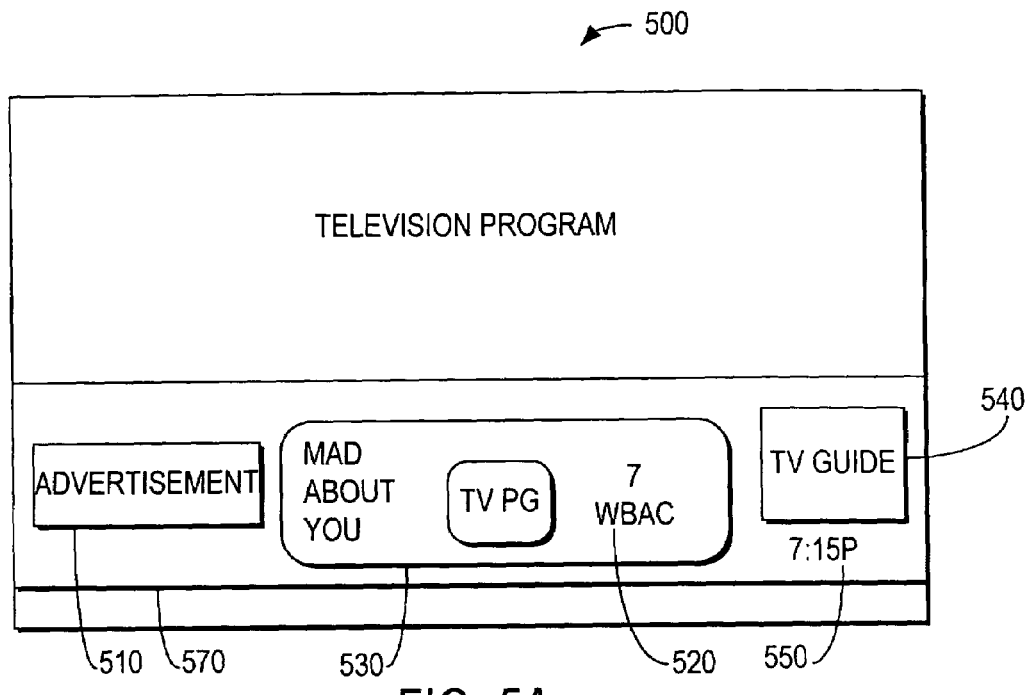
FIGS. 5A–5B show illustrative interactive displays in accordance with one embodiment of the present invention.
Figure 5B:
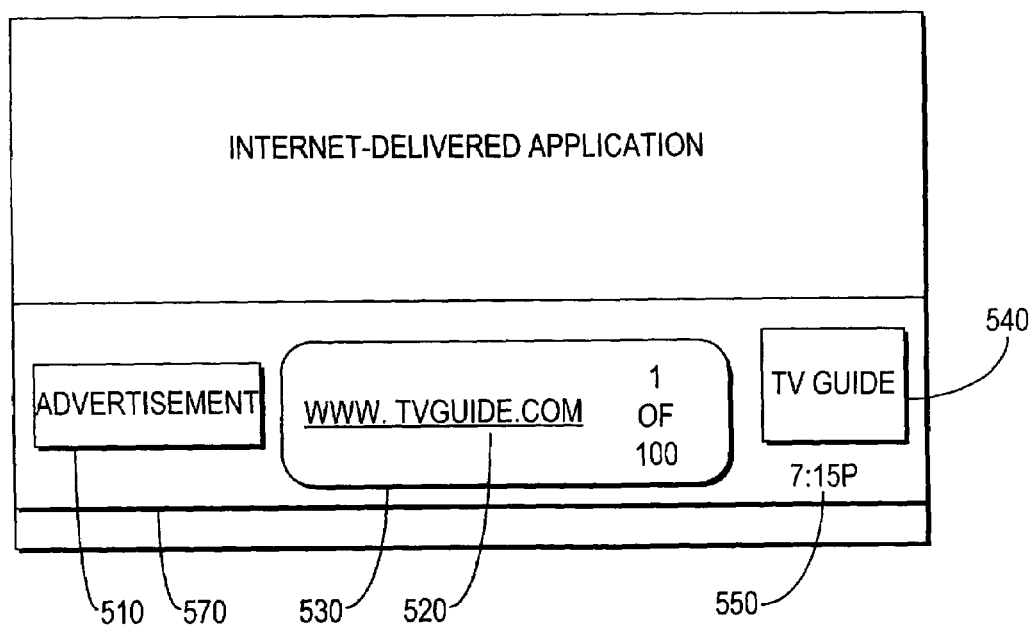

Source selection may be performed across different sources. FIGS. 5A and 5B show illustrative displays for source selection from content from a first media source, a television program, to content from a second media source, an Internet-delivered application, in accordance with one embodiment of the invention. Display 500 of FIG. 5A may include content from a first media source which may be, for example, a television program. Overlay 570 may be superimposed on display 500. In another suitable approach, overlay 570 may be provided on a display device separate from the device that includes display 500. For example, overlay 570 may be provided on an alternate display device, such as alternate display device 425 (shown in FIG. 4). Alternate display device 425 may be a hand-held device (e.g., a remote control), a monitor, or any other suitable device. Overlay 570 may include an advertisement 510, an information region 530, a provider logo 540, and a clock 550. Information region 530 may further include a source identifier 520. Source identifier 520 indicates that the media source content currently provided to the user is a television program on Channel 7, WBAC.

To select content from a second media source, for example an Internet-delivered application, a voice command from a user, such as "tvguide.com," may be received by a microphone. After receiving the voice command, the interactive media guidance application may display the user-selected website, for example, in FIG. 5B. As shown in FIG. 5B, display 560 may include an Internet-delivered application. Source identifier 520 indicates that the media source content currently provided to the user is a website, specifically, www.tvguide.com. As shown in source identifier 520, www.tvguide.com is website "1 of 100," illustrating that the website is one of 100 possible websites for selection as source content. Such websites may be determined by the interactive media guidance application, or they may be specified by a user. In another suitable approach, a voice command from a user such as "surf web" may be received to launch a web browser to the user's homepage from the television program (e.g., the first media source). A voice command such as "surf tvguide.com" may be received from the user to go to the tvguide.com website. From the website, a voice command such as "click listings" may be received from the user to simulate the action of clicking on a link labeled "listings" by the user. The Internet application may provide the user with suitable listings in response to the received voice command. Overlay 570, which may indicate the current media source content, may be removed from display 560 after a few seconds. In another suitable approach, overlay 570 may be provided on a display device separate from the device that includes display 560. For example, overlay 570 may be provided on an alternate display device, such as alternate display device 425 (shown in FIG. 4). Alternate display device 425 may be a hand-held device (e.g.; a remote control), a monitor, or any other suitable device. Thus, by receiving a suitable voice command from a user that specifies a selection of content from a source type differing from the current source type, some embodiments may provide the user with content from the new source, thereby demonstrating a source selection guidance activity.

The example of FIG. 5 illustrates content from a second source provided to a user from content from a first source. In another suitable approach, some feature of content from a second source (e.g., listings, reminders, favorites, or any other suitable feature) may be provided to a user from content from a first source. The example in FIG. 5 is shown in the context of a television channel and an Internet-delivered application. Source selection may be utilized with other media sources such as audio channels, video-on-demand content, recorded content, or any other suitable media source. In one suitable approach, the first and second media sources may be two different types of media sources. In another suitable approach, the first and second media sources may be of the same type. For example, to access a second television channel from a first television channel, a voice command from a user may be received. Such a voice command may include "channel up," "channel down," "last channel" (e.g., to access a previous channel), "next favorite channel" (e.g., to access a favorite channel), "HBO" (e.g., to access a channel by channel name), "watch 'Friends'" (e.g., to access a specific television program), or any other suitable voice command. In response to receiving the voice command, the second television channel may be provided.

Figure 6:
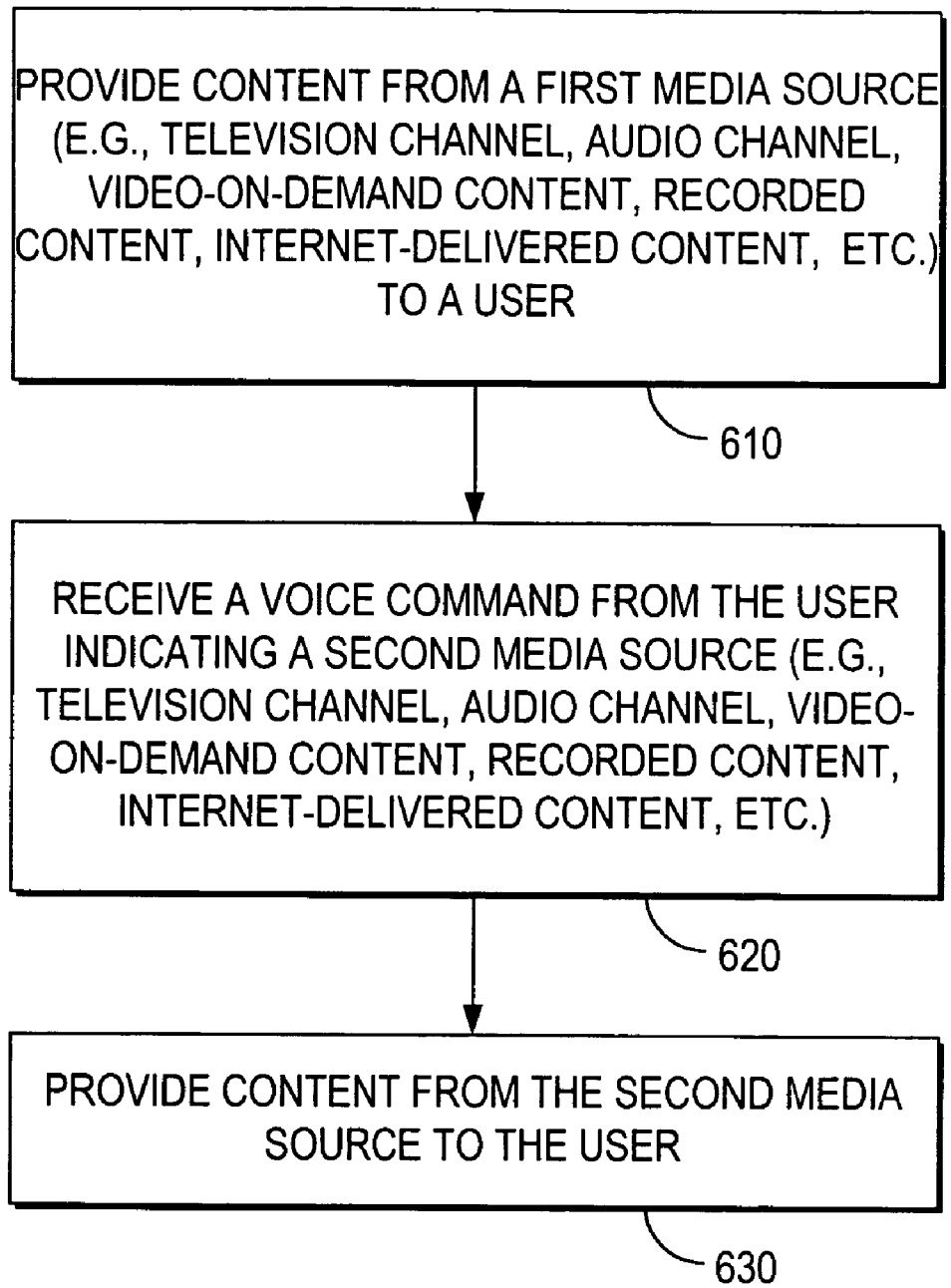
FIG. 6 is a flowchart of illustrative steps involved in source selection in an interactive media guidance application in accordance with one embodiment of the present invention.

A flowchart of illustrative steps involved in source selection in an interactive media guidance application is shown in FIG. 6. Content from a first media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) may be provided to a user at step 610. An example of this step is shown in display 500 of FIG. 5A. After content from the first source is provided to the user, a voice command from the user may be received indicating a second source (e.g., television channels/audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) at step 620. The second source may be a different type of media source than the first source (e.g., the first source is a television channel and the second source is an Internet application). In another suitable approach, the second source may be the same type of media source as the first source (e.g., the first and second sources are both television channels). Content from the second source may be provided to the user at step 630. An example of this step is shown in display 560 of FIG. 5B. The above example is merely illustrative, and any suitable steps may be employed in source selection in a media guidance application, if desired.

Some embodiments may perform browsing operations in response to received voice commands. Browsing operations may be performed from any suitable media source to browse media available for any suitable media source. For example, a user may be provided with content from a first media source, such as a television program. Upon receiving a voice command indicating content from a second media source for browsing, such as content recorded to a PVR, the interactive media guidance application may provide the user with a browse display for the content from the second source. Such a browse display may contain a list of content recorded to the PVR. Thus, in response to the received voice command, a browse display containing a list of recorded PVR content (which is the second media source) may be provided as an overlay on the television program (which is the content from the first media source). In another suitable approach, the television program video may be reduced in size so that the browse overlay does not obscure any of it. In yet another suitable approach, the overlay may be provided on a display device that is separate from the display device that includes the first source content. In another example of browsing operations, a user may be provided with an Internet-delivered application. Upon receiving a voice command indicating that the user wishes to browse a list of audio channels, the interactive media guidance application may provide the user with a browse display for audio channels as an overlay on the Internet-delivered application. In another suitable approach, the overlay may be provided on a display device that is separate from the display device that includes the first source content.

Figure 7A:
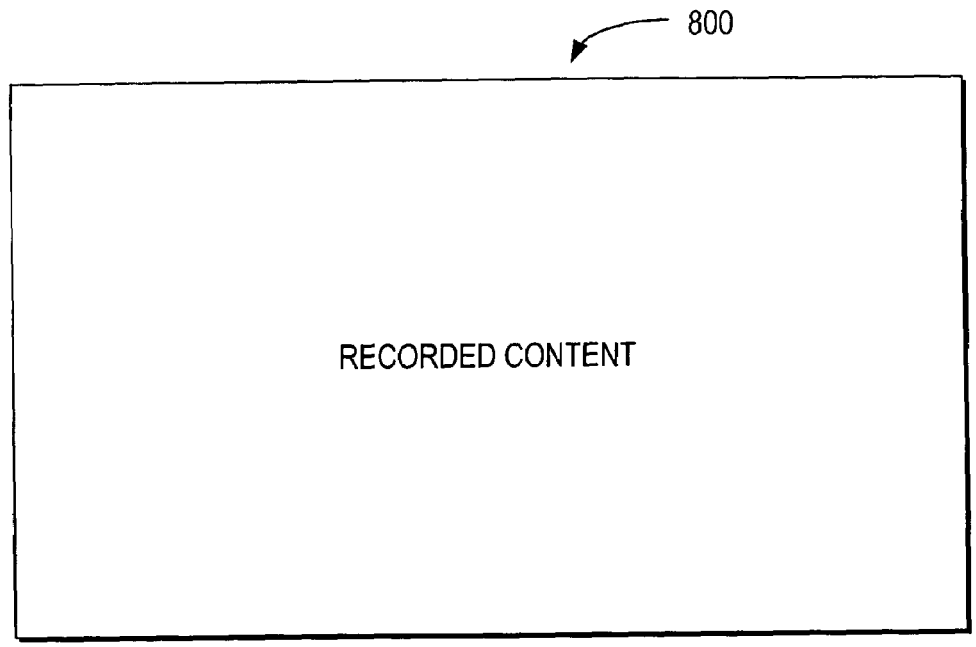
FIGS. 7A–7B show illustrative interactive displays in accordance with one embodiment of the present invention.
Figure 7B:
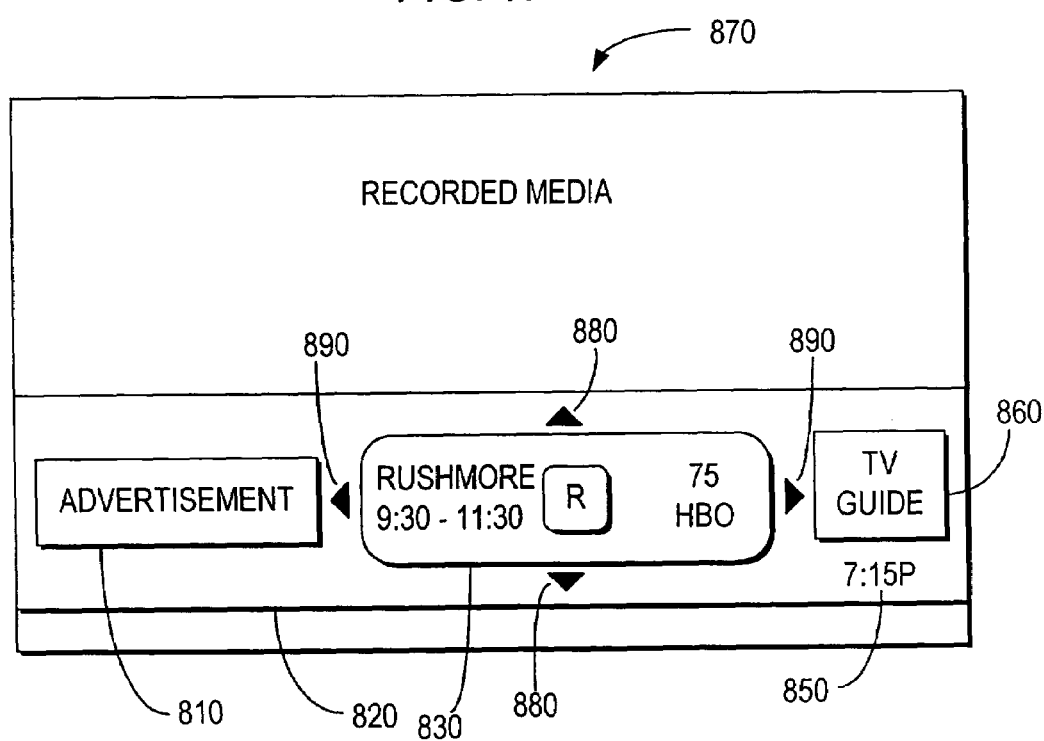

Browsing operations may be performed across different types of sources. FIGS. 7A and 7B show illustrative displays for browsing from content from a first media source, recorded content from a PVR, for content from a second media source, television channel listings, in accordance with one embodiment of the invention. Display 800 of FIG. 7A may include content from a first media source which may be, for example, recorded content from a PVR. To browse for content from a second media source, for example, television channel listings, a voice command from a user, such as "browse television channels," may be received. After receiving the voice command, the interactive media guidance application may display a browse overlay as shown, for example, in FIG. 7B.

As shown in FIG. 7B, display 870 may include recorded content from the PVR (e.g., the first source). Display 870 may include browse overlay 820. In another suitable approach, overlay 820 may be provided on a display device that is separate from the display device that includes display 870. For example, overlay 820 may be provided on an alternate display device, such as alternate display device 425 (shown in FIG. 4). Alternate display device 425 may be a hand-held device (e.g., a remote control), a monitor, or any other suitable device. Overlay 820 may include television channel listings for browsing in browse region 830. Up and down arrows 880 and right and left arrows 890 may be provided to facilitate browsing up and down to other television channels and left and right to other time slots, respectively. In another suitable approach, voice commands from the user may be received to browse to other television channels and time slots. Voice commands to browse to other time slots and television channels may include, for example, "up," "down," "later," "earlier," "channel 8" (e.g., to view the listings for a specific channel number), "HBO" (e.g., to view the listings for a specific channel name), or any other suitable voice command. Voice commands may be received from the user to perform actions from the browse display such as, for example, "watch" (e.g., to tune to the channel showing the currently-selected program), "select ad" (e.g., to select an advertisement on the browse display), "info" (e.g., to obtain information on a listing), or any other suitable voice command. Overlay 820 may also include an advertisement 810, a provider logo 860, and a clock 850. Thus, by receiving a suitable voice command from a user that specifies source content for browsing, some embodiments may provide the user with a browse overlay containing a list of content for the second source, thereby demonstrating a browsing operation.

While the example in FIG. 7 is shown in the context of recorded content from a PVR and television channels, browsing operations may be utilized with other types of media sources such as audio channels, video-on-demand content, Internet-delivered content, or any other suitable media source. In one suitable approach, the first and second media sources may be two different types of media sources. In another suitable approach, the first and second media sources may be of the same type. For example, to browse video-on-demand listings (e.g., the second source) from a video-on-demand (e.g., the first source), a voice command from a user may be received. Such a voice command may be "browse VOD." In response to receiving the voice command, a browse display that includes video-on-demand listings may be provided to the user. Voice commands may be received while browsing video-on-demand to perform actions from the video-on-demand browse display, such as, for example, "next movie," "buy," or any other suitable command.

Figure 8:
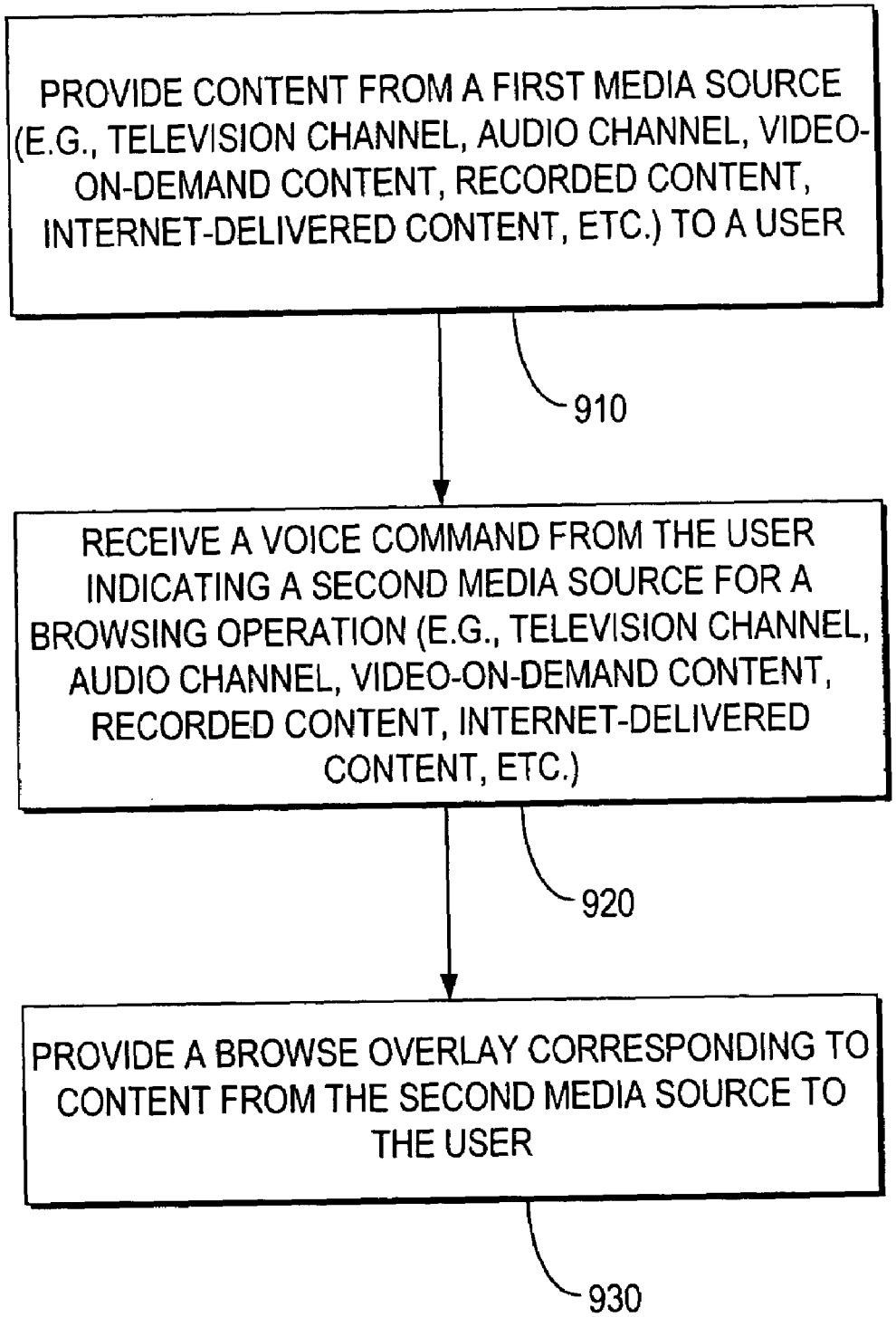
FIG. 8 is a flowchart of illustrative steps involved in browsing operations in interactive media guidance applications in accordance with one embodiment of the present invention.

A flowchart of illustrative steps involved in browsing operations in interactive media guidance applications is shown in FIG. 8. Content from a first media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) may be provided to a user at step 910. An example of this step is shown in display 800 of FIG. 7A. After content from the first media source is provided to the user, a voice command may be received from the user indicating a second media source for a browsing operation (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) at step 920. A browse overlay corresponding to content from the second media source may be provided to the user at step 930. An example of this step is shown in display 870 of FIG. 7B. The above example is merely illustrative, and any suitable steps may be employed in a browsing operation for a media guidance application, if desired.

Some embodiments may provide users with information corresponding to a media source in response to received voice commands. Responses to information requests may be provided from any suitable media source and may provide information for any suitable media source. For example, a user may be provided with content from a first media source, such as a television program. Upon receiving a voice command indicating an information request for content from a second media source, such as content recorded to a PVR, the interactive media guidance application may provide the user with audible information related to the content. In another suitable approach, the interactive media guidance application may provide the user with visual information related to the content from the second media source. Such information may include, for example, the number of files saved on the PVR, the name of the most recently-recorded file, or any other suitable information related to content recorded to the PVR. Thus, audio for the television program, which is the content from the first media source, may be replaced or augmented by audible information related to recorded content from the PVR, which is the content from the second media source, in response to the received voice command. In another suitable approach, the volume of audio for the television program may be lowered or muted.

In another example of providing a user with information, a user may be provided with, for example, an Internet-delivered application. Upon receiving a voice command indicating a request for information for an audio channel, the interactive media guidance application may perform the information request and provide the user with audible information related to the audio channel. Such audible information may replace or augment any audio associated with the Internet-delivered application. In another suitable approach, the volume of audio for the Internet-delivered application may be lowered or muted.

Figure 9:
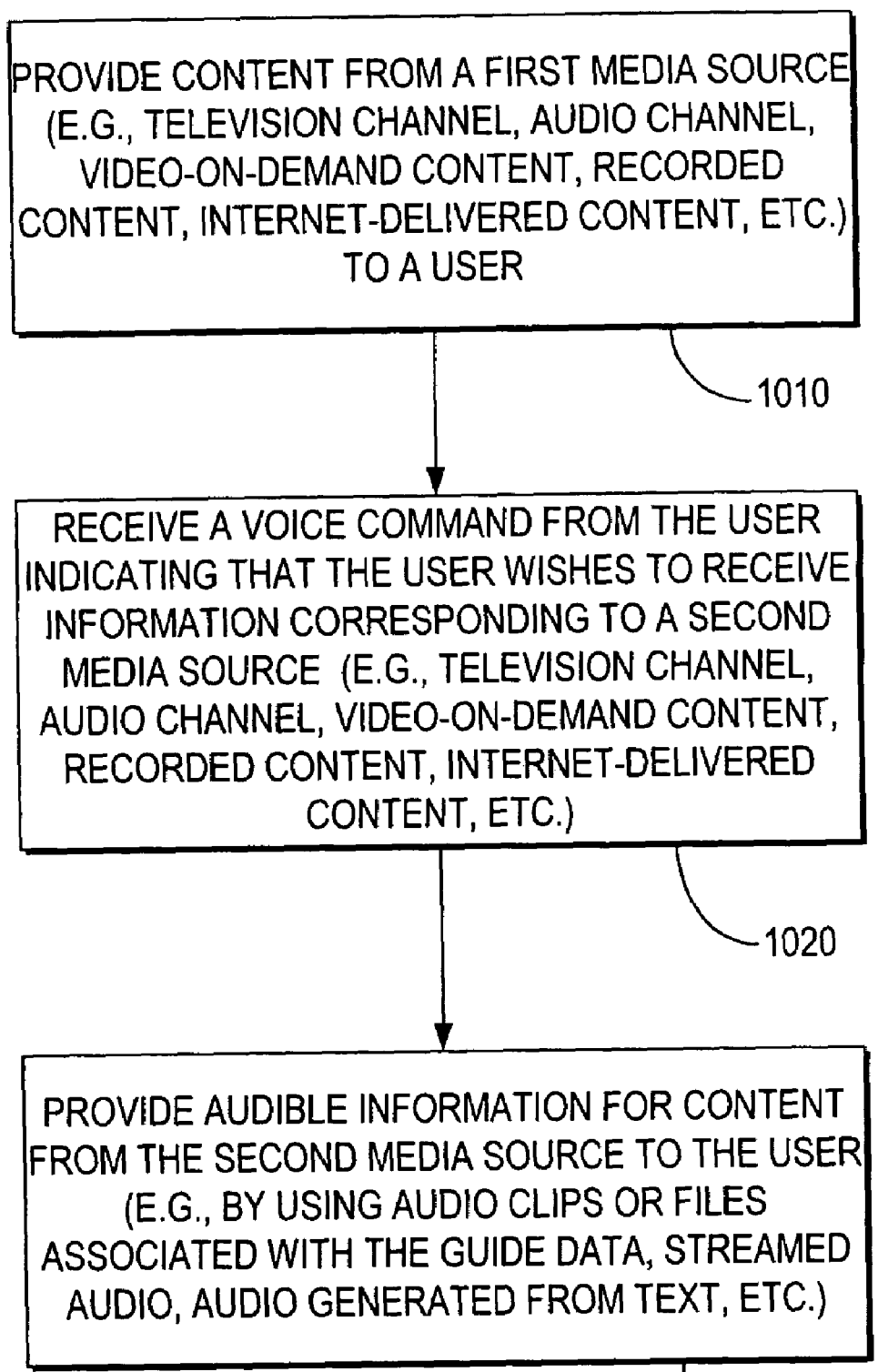
FIG. 9 is a flowchart of illustrative steps involved in providing audible information corresponding to a media source in accordance with one embodiment of the present invention.

Audible information may be provided across different sources. A flowchart of illustrative steps involved in providing audible information corresponding to a media source is shown in FIG. 9. Content from a first media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) may be provided to a user at step 1010. After content from the first media source is provided to the user, a voice command may be received from the user indicating that the user wishes to receive information corresponding to a second media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) at step 1020. Such a voice command may be, for example, "info, PVR," corresponding to a request for information for content recorded to a PVR. Another illustrative voice command may be "info, audio channels," corresponding to a request for information for audio channels. Yet another illustrative voice command may be "info, HBO," corresponding to a request for information for a specific television channel (e.g., HBO). Similarly, a voice command for any other suitable media source may be received. Audible information for content from the second media source may be provided to the user at step 1030. This may be performed using audio clips or files associated with the guidance application data, streamed audio, audio generated from text, or using any other suitable approach. The above example is merely illustrative, and any suitable steps may be employed in order to provide audible information for a source, if desired.

Some embodiments may record content from a media source in response to received voice commands. Recording may be performed from any suitable media source. For example, a user may be provided with content from a first media source. Upon receiving a voice command indicating that the user wishes to record content from a second media source, such as "record," the content may be recorded to a desired recording device. In another suitable approach, source content may be recorded from an associated browse screen, listing screen, information screen, or any other suitable associated screen. In yet another suitable approach, a voice command specifying a program or a channel from which to record content may be received, for example, "record 'Seinfeld.'" This is an example of "one word record" functionality. A default recording device (e.g., DVD recorder, PVR, VCR, CD recorder, or any other suitable recording device) may be specified by the user at some time prior to recording such that upon receiving the command "record," the content of the second media source is automatically recorded to the default device.

In another suitable approach, the device on which to record the content from the second media source may be specified by receiving an additional command from the user, such as "PVR," "VCR," "DVD recorder," "CD recorder," or any other command corresponding to a suitable recording device. In yet another suitable approach, multiple users may be provided for such that a file to record the content may be specified by the user. For example, an audible question may be provided to the user, such as, "What file?" To this question, a user name such as "Dad" may be received from the user. Thus, the content may be recorded to Dad's file. In yet another suitable approach, a specific file to record content from a second media source may be chosen based on voice recognition. For example, a voice command to record may be received from a user. A voice recognition system, such as voice recognition system 435 of FIG. 4, may determine the user's identity based on the user's voice, based on the microphone that received the voice command, or based on any other suitable approach. The content of the second media source may record to a file associated with the identity of the user.

In an example of recording media source content in response to received voice commands, an audio channel may be provided to a user. A voice command such as "record" may be received indicating, for example, that the user wishes to record the content of the audio channel. This content may be recorded to a default device. However, an additional command may be received indicating a user-specified device on which to record the content of the audio channel. For example, a command such as "CD recorder" may be received. In another example, an Internet-delivered application, such as a website, may be provided to a user. A voice command such as "record" may be received indicating, for example, that the user wishes to save the link to the website. This link may be saved, for example, in a directory of websites in a suitable media guidance application. The media source content, in this example the link, may be recorded to a general file for use by all users. However, an additional command may be received indicating a user-specified file in which to save the link. For example, a command such as "Lisa's file" may be received, indicating that Lisa's file is the desired destination for the link. Voice commands may be received from a user to specify recording parameters such as start time, end time, recording quality, or any other suitable recording parameter.

Figure 10:
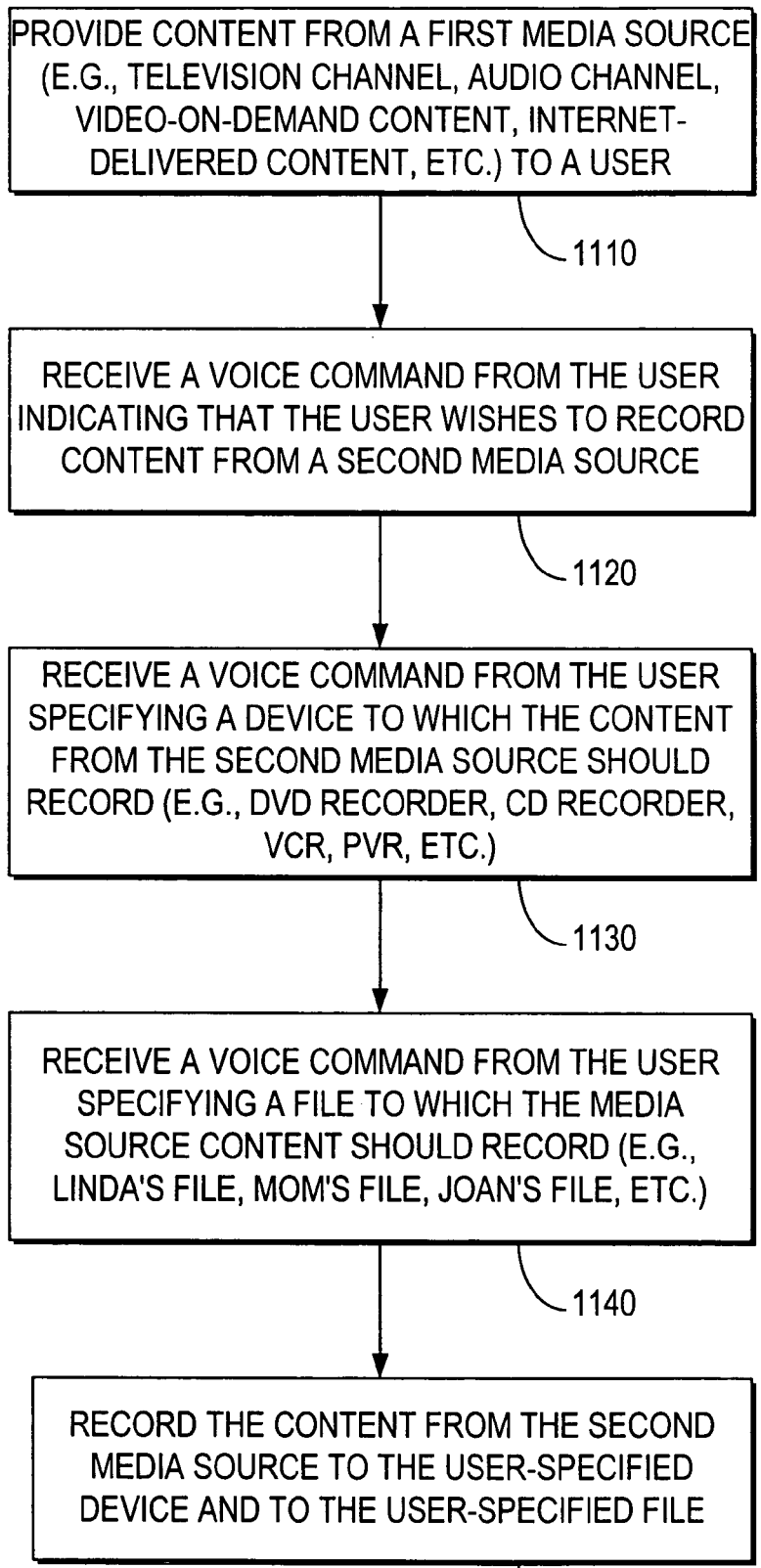
FIG. 10 is a flowchart of illustrative steps involved in recording content from a media source in accordance with one embodiment of the present invention.

Sources may be recorded in response to received voice commands from a user. A flowchart of illustrative steps involved in recording media source content is shown in FIG. 10. Content from a first media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) may be provided to a user at step 1110. After the content from the first media source is provided to the user, a voice command may be received from the user indicating that the user wishes to record content from a second media source at step 1120. Such a voice command may be, for example, "record." In another suitable approach, the content from the second media source may be recorded from an associated browse screen, listing screen, information screen, or any other suitable associated screen.

In one suitable approach, the second source may be the same type of media source as the first source (e.g., the first and second sources are both television channels). In another suitable approach, the first and second sources may be different types of media sources (e.g., the first source is a television channel and the second source is an audio channel). A voice command may be received from the user specifying a device to which the content should record at step 1130. Such a voice command may be, for example, "DVD recorder," "CD recorder," "VCR," "PVR," or any other suitable command corresponding to a recording device.

A voice command may be received from the user specifying a file to which the content should record at step 1140. Such a voice command may be, for example, "Linda's file," "Mom's file," "Joan's file," or any other suitable command corresponding to a file. In another suitable approach, a specific file to record content from a second media source may be chosen based on voice recognition. For example, a user may give a voice command to record. A voice recognition system, such as voice recognition system 435 of FIG. 4, may determine the user's identity based on the user's voice, based on the microphone that received the voice command, or based on any other suitable approach. The media source content may record to a file associated with the identity of the user. The content may be recorded to the user-specified device and to the user-specified file at step 1150. The above example is merely illustrative, and any suitable steps may be employed in order to record media source content, if desired. For example, it may be unnecessary to receive identification of user-specified devices and/or files. Voice commands may be received from a user to specify recording parameters such as start time, end time, recording quality, or any other suitable recording parameter.

Some embodiments may play back previously-recorded media source content in response to received voice commands. Playing back may be performed from any suitable media source. For example, a user may be provided with content from a media source. Upon receiving a voice command indicating that the user wishes to play back previously-recorded media source content, such as "play back," previously-recorded media source content may be played back from a desired recording device. A default recording device (e.g., DVD recorder, PVR, VCR, CD recorder, or any other suitable recording device) may be specified by the user at some time prior to playing back such that upon receiving the command "play back," the previously-recorded media source content is automatically played back from the default device. The previously-recorded media source content may not be content recorded by the user. For example, the content may be video-on-demand.

In another suitable approach, the device from which to play back the previously-recorded media source content may be specified by receiving an additional command from the user, such as "PVR," "VCR," "DVD recorder," "CD recorder," or a command corresponding to any other suitable recording device. In yet another suitable approach, multiple users may be provided for such that a file from which to play back the media source content may be specified by the user. For example, an audible question may be provided to the user, such as, "What file?" To this question, a user name such as "Dad" may be received from the user. Thus, the source content may be played back from Dad's file. In yet another suitable approach, a specific file from which to play back media source content may be chosen based on voice recognition. For example, a voice command to play back may be received from a user. A voice recognition system, such as voice recognition system 435 of FIG. 4, may determine the user's identity based on the user's voice, based on the microphone that received the voice command, or based on any other suitable approach. The source content may be played back from a file associated with the identity of the user.

Figure 11:
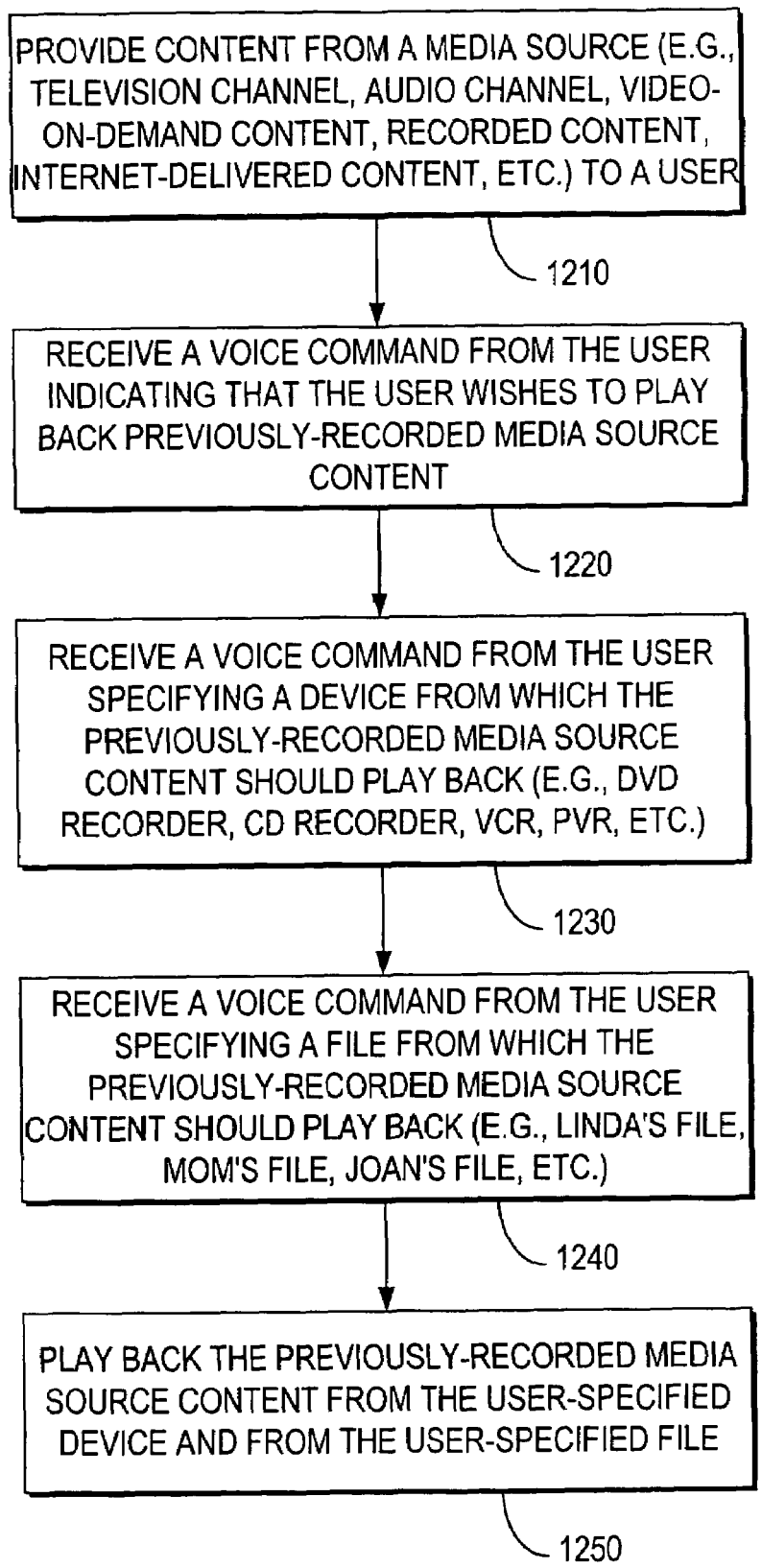
FIG. 11 is a flowchart of illustrative steps involved in playing back content from a previously-recorded media source in accordance with one embodiment of the present invention.

Previously-recorded media source content may be played back in response to receiving voice commands from a user. A flowchart of illustrative steps involved in playing back previously-recorded media source content is shown in FIG. 11. Content from a media source (e.g., television channels, audio channels, video-on-demand content, recorded content (e.g., content recorded to a PVR, VCR, CD recorder, DVD recorder, or any other suitable recording device), Internet-delivered content (e.g., websites, video, or any other suitable Internet-delivered content), or any other suitable media source) may be provided to a user at step 1210. After the content from the media source is provided to the user, a voice command may be received from the user indicating that the user wishes to play back previously-recorded media source content. Such a voice command may be, for example, "play back."

A voice command may be received from the user specifying a device from which the previously-recorded media source content should play back at step 1230. Such a voice command may be, for example, "DVD recorder," "CD recorder," "VCR," "PVR," or any other suitable command corresponding to a recording device. A voice command may be received from the user specifying a file from which the previously-recorded media source content should play back at step 1240. Such a voice command may be, for example, "Linda's file," "Mom's file," "Joan's file," or any other suitable command corresponding to a file. In another suitable approach, a specific file from which to play back media source content may be chosen based on voice recognition. For example, a voice command to play back may be received from a user. A voice recognition system, such as voice recognition system 435 of FIG. 4, may determine the identity of the user based on the user's voice, based on the microphone that received the voice command, or based on any other suitable approach. The media source content may be played back from a file associated with the identity of the user. The previously-recorded source content may be played back from the user-specified device and from the user-specified file at step 1250. The above example is merely illustrative, and any suitable steps may be employed in order to play back previously-recorded media source content, if desired. For example, it may be unnecessary to receive identification of user-specified devices and/or files. Voice commands from a user may be received corresponding to a specific program name. In response to the received voice command, the previously-recorded program may be played back. Voice commands from a user may be received while a program is playing back, such as, for example, "stop," "pause," "play," "fast forward," "rewind," or any other suitable command.

Some embodiments may receive selections of features for an audible favorites list from a user and may provide the features of the favorites list to the user in an audible scan. For example, a user may be provided with a menu from which features may be selected for inclusion in an audible favorites list. Such a menu may include, for example, non-media options (e.g., sports, weather, news, stocks, traffic, or any other suitable non-media option), media-related options (e.g., channels, programs, settings, reminders, advertisements, or any other suitable media-related option), or any other features suitable for inclusion in the audible favorites list. The interactive media guidance application may provide information related to the user-selected features in an audible scan. This information may be provided to the user automatically. In another suitable approach, this information may be provided to the user in response to a user voice command requesting to listen to the audible favorites. The audible information may be provided using audio clips or files associated with the favorites features, streamed audio, audio generated from text, or using any other suitable approach. The user may interact with the information provided in the audible scan.

Figure 12:
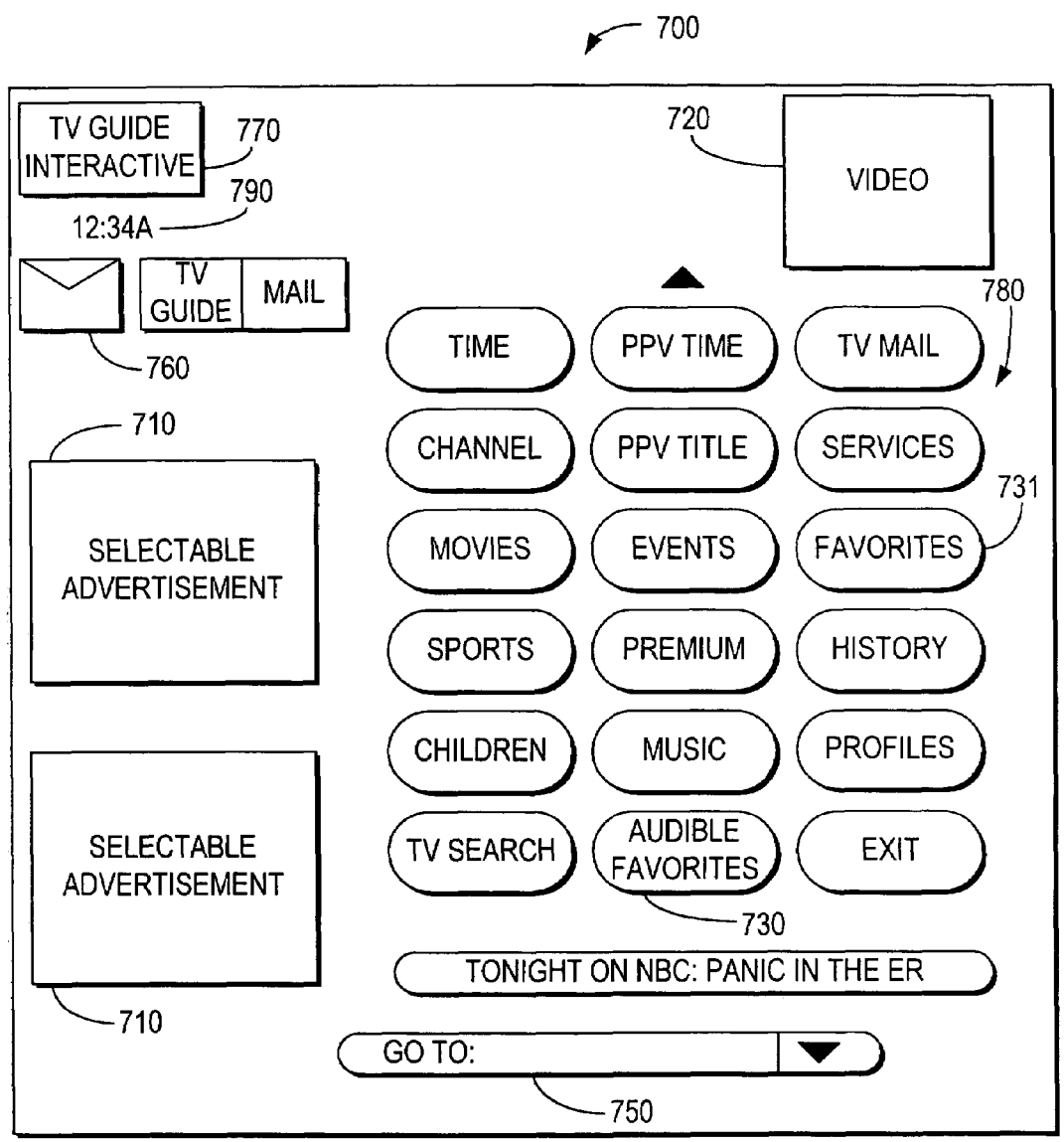
FIG. 12 shows an illustrative interactive display in accordance with one embodiment of the present invention.

Selections of features for an audible favorites list may be received from a user, and information related to the features may be provided to the user in an audible scan. As shown in FIG. 12, a display 700 may be provided to the user. Display 700 may include, for example, a menu 780 of selectable program guide features, one or more selectable advertisements 710, a cable operator or sponsor brand graphic 770, the current time 790, a mail-available indicator 760, a web browser link 750, and a media-in-guide window 720. One illustrative program guide feature is an Audible Favorites option 730. A selection of option 730 from the user may be received. The user's selection of option 730 may be made by using suitable key on a remote control, by giving a suitable voice command, or by any other suitable approach. In another suitable approach, a selection of Favorites option 731 may be received. Option 731 may allow creation of an audible favorites lists (not shown).

Figure 13:
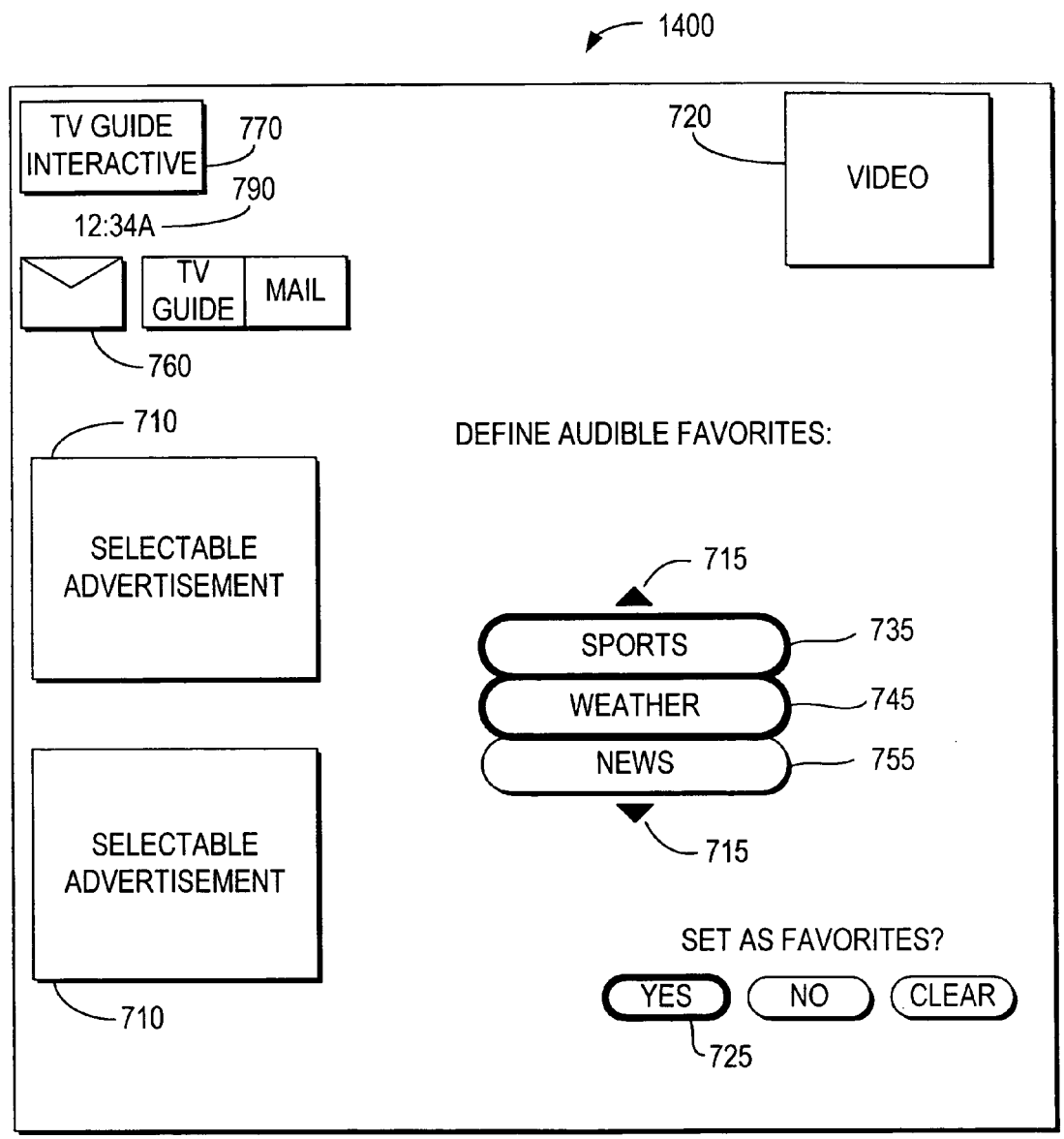
FIG. 13 shows another illustrative interactive display in accordance with one embodiment of the present invention.

FIG. 13 shows an illustrative audible favorites set-up display 1400 that may be provided in response to user-selected option 730. Display 1400 may contain, for example, a menu 755 of selectable favorites features, one or more selectable advertisements 710, a cable operator or sponsor brand graphic 770, the current time 790, a mail-available indicator 760, and a media-in-guide window 720. Selection of elements from menu 755 to be included in an audible favorites list may be received. Menu 755 may contain non-media options for inclusion in the favorites list. Possible non-media options may include, for example, sports, weather, news, stocks, traffic, or any other suitable non-media option. Menu 755 may also contain media-related options, such as, for example, channels, programs, settings, reminders, advertisements, or any other suitable media-related option. For example, an audible scan of favorite channels may include a description of programming currently airing on a user's favorite channels. Up and down arrows 715 may be utilized to scroll through menu 755. A user may utilize up and down arrows 715 by using up and down keys on a remote control, by using voice commands such as "up" and "down," or by using any other suitable approach. As shown, options 735 and 745, sports and weather, respectively, have been selected by the user from menu 755 for inclusion in the favorites list. To enter the selections, button 725 may be selected by the user. In another suitable approach, a favorites key on a remote control may be selected by the user to enter the selections. In yet another suitable approach, a voice command from the user may be received to enter the selections.

The features of the favorites list may be provided to the user in audible form in an audible scan mode. For example, for the favorites list described above, audible weather and sports information may be provided to the user. This information may be provided to the user automatically. In another suitable approach, this information may be provided to the user in response to a user voice command. Such a command may be, for example, "favorites." The audible information may be provided using audio clips or files associated with the favorites features, streamed audio, audio generated from text, or using any other suitable approach. Multiple favorites lists corresponding to multiple users may be available. A favorites list corresponding to a specific user may be provided based on voice recognition. For example, a voice command may be received from a user to hear a favorites list. A voice recognition system, such as voice recognition system 435 of FIG. 4, may determine the user's identity based on the user's voice, based on the microphone that received the voice command, or based on any other suitable approach. The favorites list associated with the identity of the user may be provided.

Figure 14:
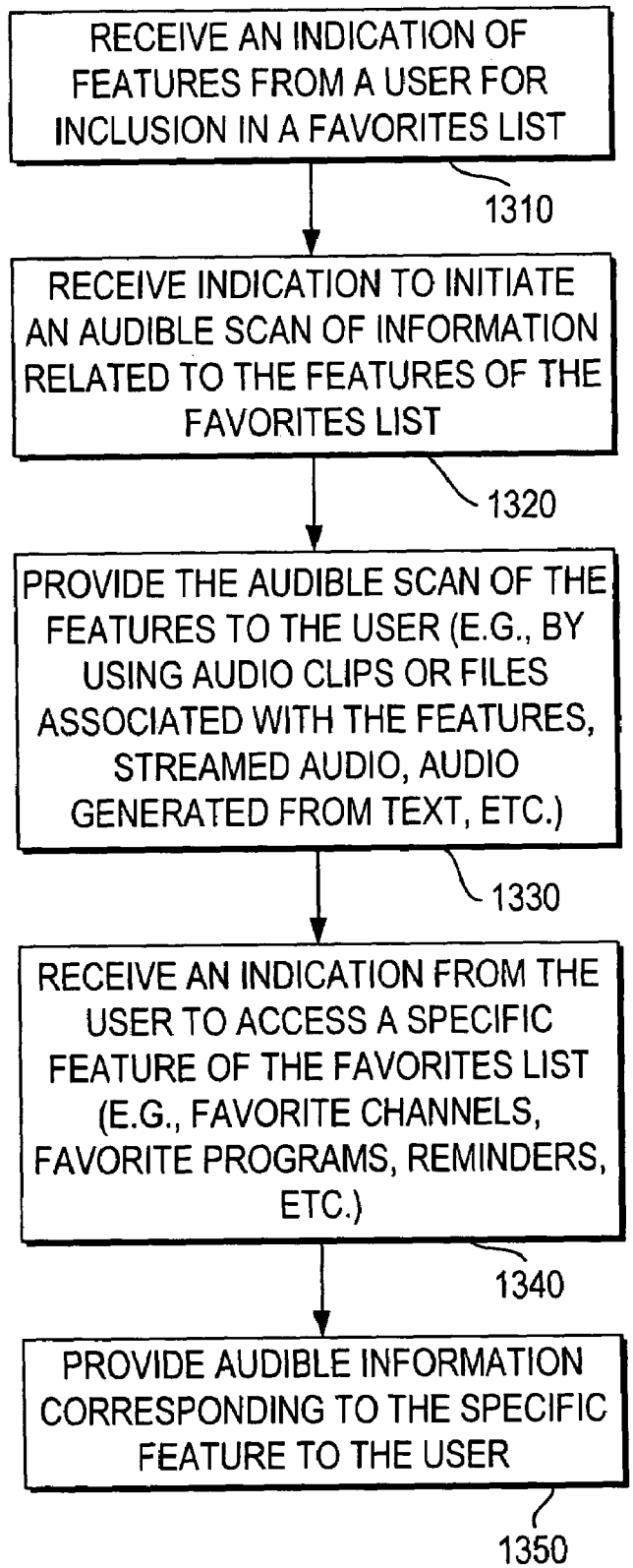
FIG. 14 is a flowchart of illustrative steps involved in receiving selections of features for an audible favorites list from a user and providing the features of the favorites list to the user in an audible scan in accordance with one embodiment of the present invention.

A flowchart of illustrative steps involved in receiving selections of features for an audible favorites list from a user and providing the features of the favorites list to the user in an audible scan is shown in FIG. 14. An indication of features from a user for inclusion in a favorites list is received at step 1310. An illustrative example of this step is shown in FIG. 13. After receiving the indication of features from the user, an indication to initiate an audible scan of information related to the features of the favorites list may be received at step 1320. Such an indication may be received from the user (e.g., by receiving a voice command such as "favorites"), from a timer which is programmed with a specific interval suitable for providing the passive scan, or from any other suitable indicator. The audible scan of the features may be provided to the user (e.g., by using audio clips or files associated with the features, streamed audio, audio generated from text, or any other suitable way to provide audible information) at step 1330. An indication may be received from the user to access a specific feature of the favorites list (e.g., favorite channels, favorite programs, reminders, or any other suitable feature) at step 1340. Audible information corresponding to the specific feature may be provided to the user at step 1350. For example, in response to an indication to access favorite channels, media corresponding to a favorite channel may be provided to the user. The above example is merely illustrative, and any suitable steps may be employed in order to receive selections of features for an audible favorites list from a user and provide the features of the favorites list to the user in an audible scan. For example, a user may interact with the information provided in the audible scan. The user may be able to give a voice command such as "stop" (e.g., to stop the audible scan), "watch," "listen," "record," or any other suitable command related to a favorites feature.

Some embodiments may provide features specific to a user based on the user's identity. For example, a voice command from a user may be received by a microphone. A voice recognition system may determine the user's identity by the sound of the voice giving the voice command, by the microphone used to give the voice command (e.g., by associating a specific user with a specific microphone for receiving voice commands), or by any other suitable approach for user identification. The identity of the user may be used to provide features specific to the user. Such features may include, for example, customized guide interfaces, targeted advertisements, audience measuring, favorites, or any other suitable user-specific feature.

Figure 15:
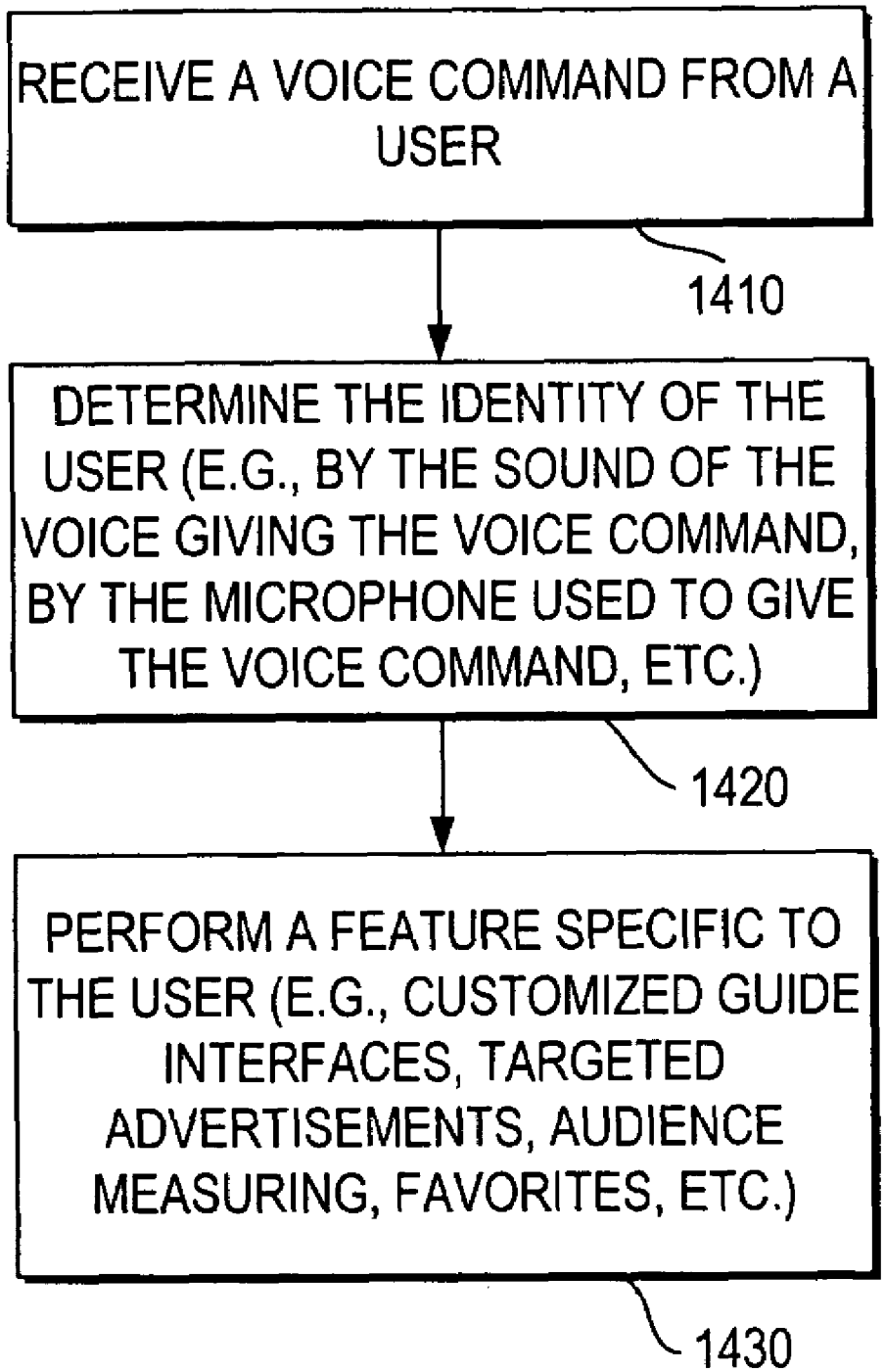
FIG. 15 is a flowchart of illustrative steps involved in determining a user's identity and providing a feature specific to the user in accordance with one embodiment of the present invention.

A flowchart of illustrative steps involved in determining the identity of a user and providing a feature specific to the user is shown in FIG. 15. A voice command from a user may be received at step 1410. After receiving the voice command from the user, the guidance application may determine the identity of the user at step 1420. For example, the identity of a user may be determined by the sound of the voice giving the voice command, by the microphone used to give the voice command (e.g., by associating a specific user with a specific microphone for receiving voice commands), or by any other suitable approach for user identification. A feature specific to the user may be performed at step 1430. For example, features such as customized guide interfaces, targeted advertisements, audience measuring, favorites, or any other suitable feature may be provided to the user at step 1430. Information previously-provided by a user (e.g., ratings, genre, favorites, etc.) may be used to provide the user with a customized guide interface. For example, explicit information that the user provides either verbally or non-verbally may be used to create a guide interface appropriate for the current user. The above example is merely illustrative, and any suitable steps may be employed in order to determine the identity of a user and provide a feature specific to the user.

Some embodiments may provide a user with targeted advertisements based on the user's monitored actions. An example of an interactive television program guide in which targeted advertisements may be presented to a user is described, for example, in Knudson et al. U.S. patent application Ser. No. 09/034,939, filed Mar. 4, 1998. Actions of a user may be monitored to determine user characteristics. For example, actions such as programs viewed, websites visited, music selected, or any other suitable action, may be monitored. A voice command from a user may be received by a microphone. A voice recognition system, such as voice recognition system 435 of FIG. 4, may determine the user's identity. The voice recognition system may be able determine the user's identity by the sound of the voice giving the voice command, by the microphone used to give the voice command (e.g., by associating a specific user with a specific microphone for receiving voice commands), or by any other suitable approach for user identification. The user may be provided with targeted advertisements based on the user's characteristics. For example, a user may consistently watch action movies. In response to the user's interest in action movies, advertisements for upcoming action movies may be provided to the user. In one suitable approach, targeted advertisements may be associated with a user for use in the future. For example, the next time a media guidance application is utilized by the user and a voice command is received, targeted advertisements may be provided to the user in response to the user's previous actions.

Figure 16:
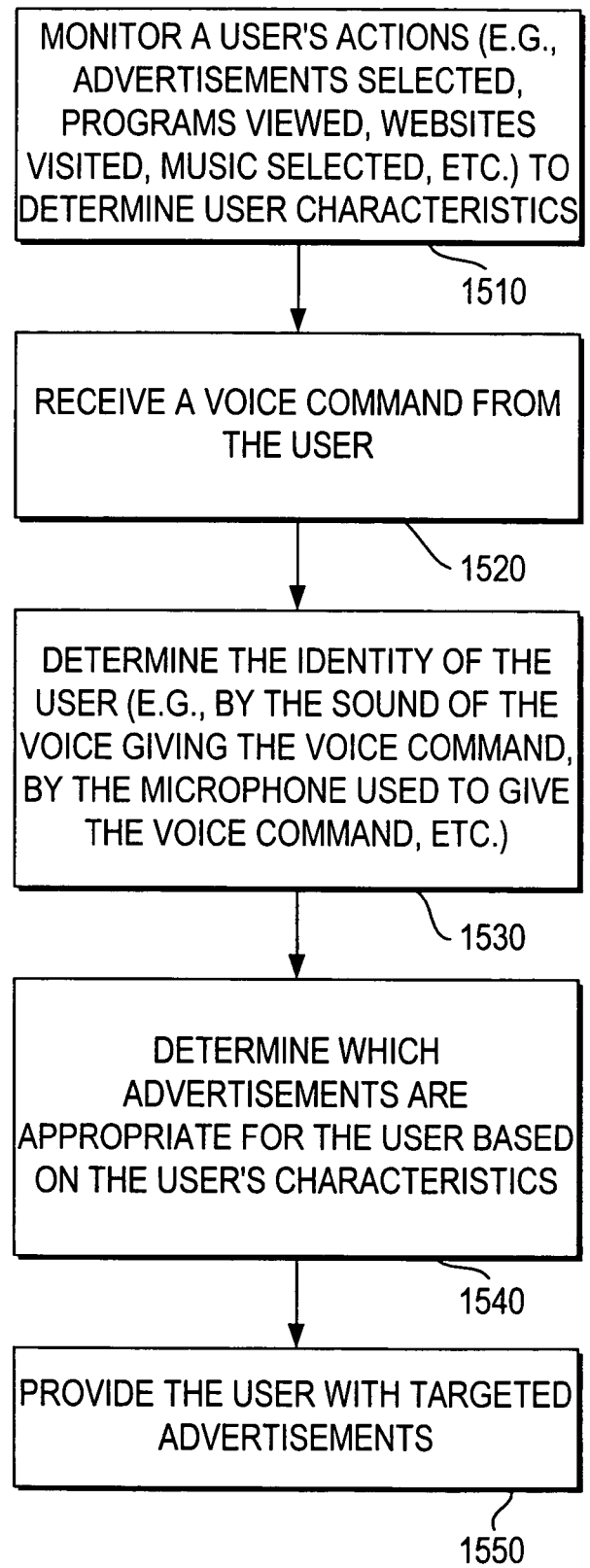
FIG. 16 is a flowchart of illustrative steps involved in determining a user's identity and providing targeted advertisements to the user in accordance with one embodiment of the present invention.

A flowchart of illustrative steps involved in providing a user with targeted advertisements based on the user's monitored actions is shown in FIG. 16. Actions of the user may be monitored at step 1510 to determine user characteristics. For example, actions such as programs viewed, websites visited, music selected, or any other suitable action, may be monitored. Such user characteristics may be used to determine advertisements appropriate for the user. A voice command from a user may be received at step 1520. After receiving the voice command from the user, the guidance application may determine the identity of the user at step 1530. For example, the identity of a user may be determined by the sound of the voice giving the voice command, by the microphone used to give the voice command (e.g., by associating a specific user with a specific microphone for receiving voice commands), or by any other suitable approach for user identification. The guidance application may determine which advertisements are appropriate for the user based on the user's characteristics at step 1540. The user may be provided with targeted advertisements at step 1550. The above example is merely illustrative, and any suitable steps may be employed in order to provide a user with targeted advertisements.

Some embodiments may determine the identity of a user and measure an audience based on the user's profile. The user's profile may include demographic data. For example, a voice command from a user may be received by a microphone. A voice recognition system, such as voice recognition system 435 of FIG. 4, may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The user may be provided with content from a media source, such as a television program. Audience information for the television program may be measured by using a user profile associated with the user. The user profile may include demographic data such as, for example, age, gender, nationality, profession, income, location, or any other suitable data. The audience information may be measured using this data to create a detailed description of the audience. The description of the audience may result in determining future marketing opportunities for the television program (e.g., suitable commercials to be shown during the television program), attracting other viewers with similar demographic data, or any other suitable result.

Figure 17:
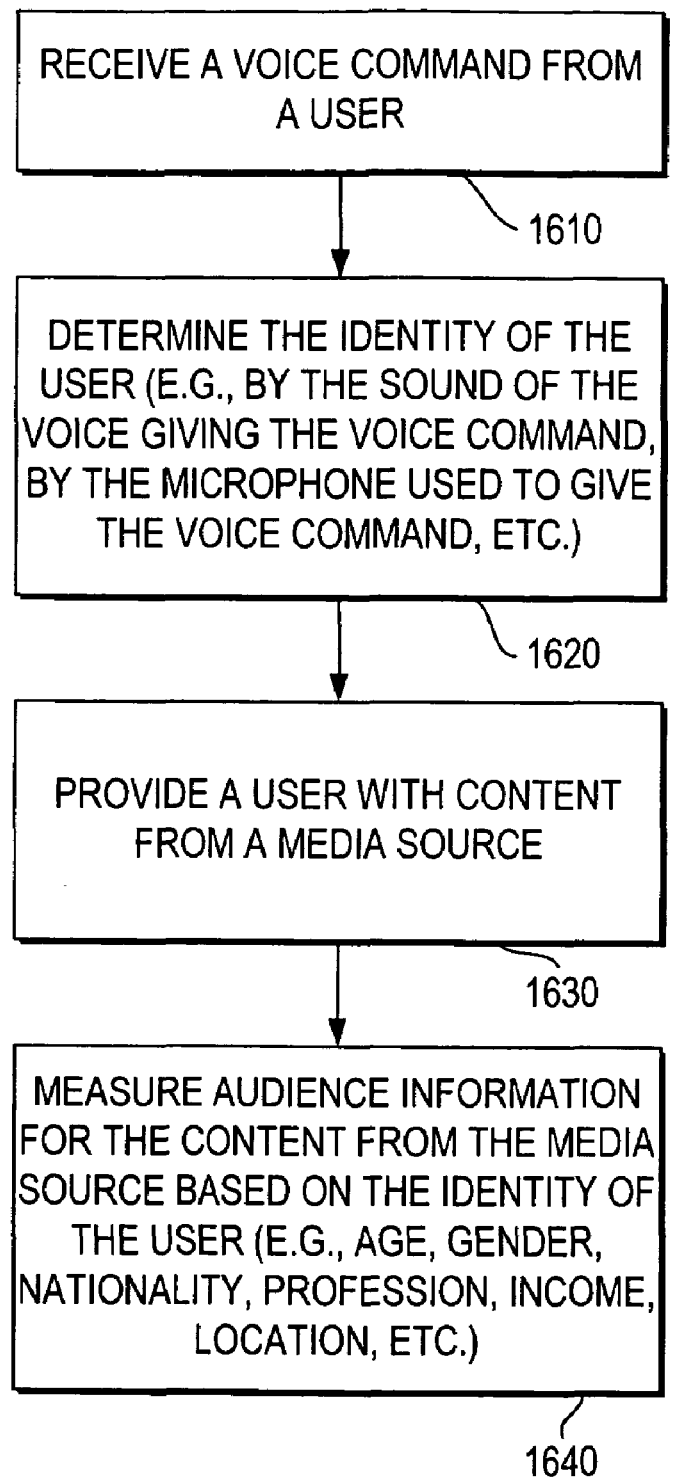
FIG. 17 is a flowchart of illustrative steps involved in determining a user's identity and measuring an audience based on the user's profile in accordance with one embodiment of the present invention.

A flowchart of illustrative steps involved in determining the identity of a user and measuring an audience based on the user's profile is shown in FIG. 17. At step 1610, a voice command from a user may be received. After receiving the voice command from the user, the guidance application may determine the identity of the user step 1620. For example, the identity of a user may be determined by the sound of the voice giving the voice command, by the microphone used to give the voice command (e.g., by associating a specific user with a specific microphone for receiving voice commands), or by any other suitable approach for user identification. The user may be provided with content from a media source at step 1630. Audience information for the content from the media source may be measured at step 1640 based on the identity of the user. The identity of the user may include user profile data such as, for example, age, gender, nationality, profession, income, location, or any other suitable data. The audience may be measured using this data to create a detailed description of the audience. The above example is merely illustrative, and any suitable steps may be employed in order to measure an audience based on a user's identity.

Some embodiments may determine the identity of a user and may provide the user with favorites features based on the user's identity. Favorites features may include a user's favorite television channels, websites, audio channels, or any other suitable feature. For example, a voice command from a user may be received by a microphone. A voice recognition system, such as voice recognition system 435 of FIG. 4, may determine the user's identity. The voice recognition system may be able to identify a user by the sound of the voice giving the voice command, by the microphone used to give the voice command (e.g., by associating a specific user with a specific microphone for receiving voice commands), or by any other suitable approach for user identification. The user may be provided with favorites features based on the user's identity.

Figure 18:
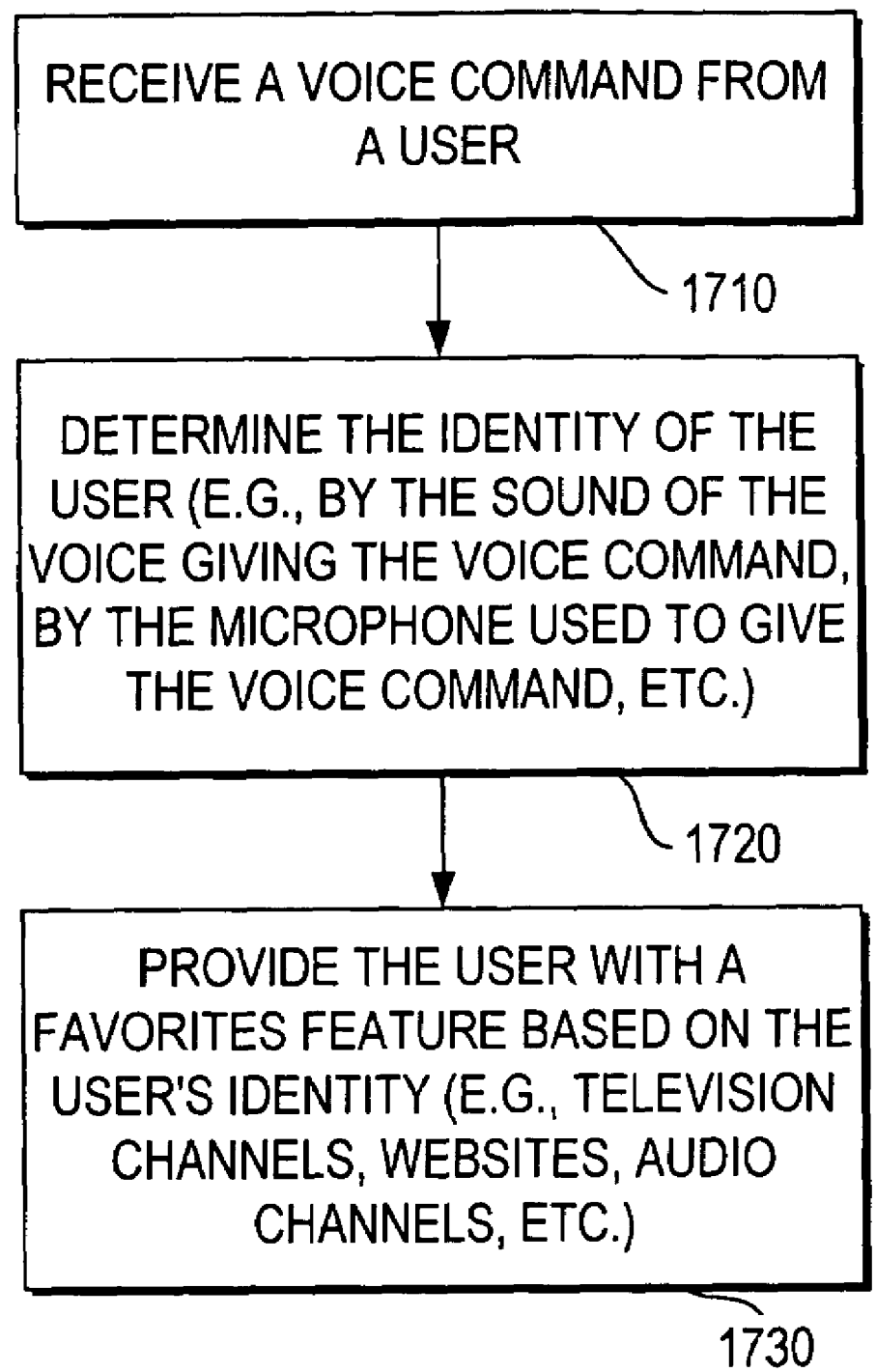
FIG. 18 is a flowchart of illustrative steps involved in determining a user's identity and providing a favorites feature in accordance with one embodiment of the present invention.

A flowchart of illustrative steps involved in providing a user with favorites features based on the user's identity is shown in FIG. 18. At step 1710, a voice command from a user may be received. After receiving the voice command from the user, the guidance application may determine the identity of the user at step 1720. For example, the identity of a user may be determined by the sound of the voice giving the voice command, by the microphone used to give the voice command (e.g., by associating a specific user with a specific microphone for receiving voice commands), or by any other suitable approach for user identification. The user may be provided with favorites features based on the user's identity at step 1730. For example, the user's favorite television channels, favorite websites, favorite audio channels, or any other suitable favorites feature may be provided. The above example is merely illustrative, and any suitable steps may be employed in order to provide a user with favorites features based on the user's identity.

Thus, systems and methods for providing a user interface with speech recognition to allow users to navigate within interactive media guidance applications are provided. It will be understood that the foregoing is only illustrative of the principles of the invention and that various modifications can be made by those skilled in the art without departing from the scope and spirit of the invention, which is limited only by the claims that follow.

What is claimed is:

1. A method for providing user-specific features in an interactive media guidance application, comprising:

receiving a voice command from a user to record media content;

determining an identity of the user based on the voice command to record media content; and recording the media content to a recording device, wherein the recorded media content is associated with the user in response to the determination of the identity of the user.

2. The method of claim 1, further comprising:

in response to the determination of the identity of the user, providing a user interface that is customized to the user.

3. The method of claim 1, further comprising:

in response to the determinatin of the identity of the user, providing an advertisement that is targeted to the user based on at least one of: the user's characteristics and the user's previous actions.

4. The method of claim 1, further comprising:

in response to the determination of the identity of the user, measuring audience information for the media content by automatically using demographic data for the identified user.

5. The method of claim 1, further comprising:

in response to the determination of the identity of the user, providing a feature to the user based on a user profile associated with the user.

6. The method of claim 1, further comprising:

in response to the determination of the identity of the user, providing a favorites feature that is based on the identity of the user.

7. The method of claim 1, wherein recording the media content includes recording the media content to a file specific to the user.

8. The method of claim 1, further comprising:

receiving a voice command from the user to play recorded media content;

determining the identity of the user based on the voice command to play recorded media content; and presenting the recorded media content associated with the user.

9. The method of claim 8, wherein:

recording the media content includes recording the media content to a file specific to the user; and presenting the recorded media content includes presenting the media content recorded in the file specific to the user.

10. A system for providing user-specific features in an interactive media guidance application, comprising:
   a microphone;
   a user output device comprising a display device and a speaker; and
   an interactive media guidance application implemented at least partially on local processing circuitry and programmed to:
      receive a voice command from the microphone to record media content;
      determine an identity of the user based on the voice command to record media content; and
      record the media content to a recording device, wherein the recorded media content is associated with the user in response to the determination of the identity of the user.

11. The system of claim 10 wherein the interactive media guidance application is further programmed to direct the speaker to provide an output to the user.

12. The system of claim 10 wherein the interactive media guidance application is further programmed to direct the display device to provide an output to the user.

13. The system of claim 10 wherein the interactive media guidance application is further programmed to direct the speaker and the display device to provide an output to the user.

14. The system of claim 10 wherein the interactive media guidance application is further programmed to, in response to the determination of the identity of the user, direct the user output device to provide a user interface that is customized to the user.

15. The system of claim 10 wherein the interactive media guidance application is further programmed to, in response to the determination of the identity of the user, direct the user output device to provide an advertisement that is targeted to the user based on at least one of: the user's characteristics and the user's previous actions.

16. The system of claim 10 wherein the interactive media guidance application is further programmed to, in response to the determination of the identity of the user, measure audience information for the media content by automatically using demographic data for the identified user.

17. The system of claim 10 wherein the interactive media guidance application is further programmed to, in response to the determination of the identity of the user, direct the user output device to provide a feature to the user based on a user profile associated with the user.

18. The system of claim 10 wherein the interactive media guidance application is further configured to, in response to the determination of the identity of the user, direct the user output device to provide a favorites feature that is based on the identity of the user.

19. The system of claim 10, wherein the recorded media content is recorded to a file specific to the user.

20. The system of claim 10, wherein the interactive media guidance application is further programmed to:
   receive a voice command from the user to play recorded media content;
   determine the identity of the user based on the voice command to play recorded media content; and
   present the recorded media content associated with the user.

21. The system of claim 20, wherein the interactive media guidance application is further programmed to:
   record the media content to a file specific to the user; and
   present the media content recorded in the file specific to the user.

* * * * *